United States Patent [19]
Sasaki et al.

[11] Patent Number: 6,005,297
[45] Date of Patent: Dec. 21, 1999

[54] POWER OUTPUT APPARATUS AND METHOD OF CONTROLLING THE SAME

[75] Inventors: Shoichi Sasaki, Shizuoka-ken; Tetsuya Abe, Toyota, both of Japan

[73] Assignee: Toyota Jidosha Kabushiki Kaisha, Toyota, Japan

[21] Appl. No.: 08/851,032

[22] Filed: May 5, 1997

[30] Foreign Application Priority Data

Sep. 13, 1996 [JP] Japan ................................ 8-265188

[51] Int. Cl.⁶ ........................... F01C 13/00; F01D 15/10
[52] U.S. Cl. ................... 290/4 C; 290/4 R; 290/38 R; 290/40 A; 290/40 B; 290/40 C; 290/46; 290/51; 318/8; 318/9; 318/77; 180/65.2; 180/65.4
[58] Field of Search ...................... 290/4 C, 4 R, 290/38 R, 40 A, 40 B, 40 C, 46, 51; 318/77, 8, 9; 180/65.2, 65.4

[56] References Cited

U.S. PATENT DOCUMENTS

| | | |
|---|---|---|
| 3,623,568 | 11/1971 | Mori . |
| 3,699,351 | 10/1972 | Addie . |
| 4,677,365 | 6/1987 | Yang . |
| 5,258,651 | 11/1993 | Sherman ................................ 290/23 |
| 5,789,877 | 8/1998 | Yamada et al. ........................ 318/9 |
| 5,794,439 | 8/1998 | Lisniansky ............................ 60/414 |
| 5,801,497 | 9/1998 | Shamoto et al. ...................... 318/139 |
| 5,804,934 | 9/1998 | Yamada et al. ...................... 318/77 |
| 5,818,116 | 10/1998 | Nakae et al. ........................ 290/38 R |
| 5,823,280 | 10/1998 | Lateur et al. ........................ 180/65.2 |

FOREIGN PATENT DOCUMENTS

| | | |
|---|---|---|
| 58401/73A | 1/1975 | Australia . |
| 0743213A | 11/1996 | European Pat. Off. . |
| 0773127A | 5/1997 | European Pat. Off. . |
| 0775607A | 5/1997 | European Pat. Off. . |
| 0798844A | 10/1997 | European Pat. Off. . |
| 2277693 | 2/1976 | France . |
| A-41 24 479 | 1/1993 | Germany . |
| A-50-30223 | 3/1975 | Japan . |
| 1193965A | 6/1970 | United Kingdom . |

Primary Examiner—Elvin G. Enad
Attorney, Agent, or Firm—Oliff & Berridge, PLC

[57] ABSTRACT

A power output apparatus 110 includes a planetary gear 120 having a planetary carrier, a sun gear, and a ring gear, an engine 150 having a crankshaft 156 linked with the planetary carrier, a first motor MG1 attached to the sun gear, and a second motor MG2 attached to the ring gear. Part of the torque generated by the engine 150 is output to a power feed gear 128 via the ring gear, while the first motor MG1 receives the residual torque. The second motor MG2 outputs a torque having a greater magnitude than and an opposite direction to this torque, so as to rotate the ring gear reversely. The electric power consumed by the second motor MG2 is supplied by the electric power regenerated by the first motor MG1. This structure enables the power output from the engine 150 to be converted to a power of reverse direction and output to the ring gear.

12 Claims, 17 Drawing Sheets

POWER OUTPUT APPARATUS AND METHOD OF CONTROLLING THE SAME

BACKGROUND OF THE INVENTION

1. Field of the Invention

The present invention relates to a power output apparatus and a method of controlling the same. More specifically the present invention pertains to a power output apparatus for outputting power to a drive shaft and a method of controlling such a power output apparatus.

2. Description of the Prior Art

Known power output apparatuses for carrying out torque conversion of power output from an engine and outputting the converted power to a drive shaft include a combination of a fluid-based torque converter with a transmission. In the torque converter, an input shaft and an output shaft of the power are not fully locked. This causes a slip between the input shaft and the output shaft and leads to an energy loss corresponding to the slip. The energy loss is expressed as the product of the revolving speed difference between the input shaft and the output shaft and the torque transmitted to the output shaft, and is consumed as heat.

In the conventional power output apparatus, the transmission is used as a reverse gear for reversing the rotation of the output shaft of the engine and transmitting the reversed rotation, in order to rotate the drive shaft in reverse of the rotation of the output shaft of the engine.

In a vehicle having such a power output apparatus mounted thereon as its power source, at the time when significantly large power is required, for example, at the time of starting the vehicle or running the vehicle on an upward slope at a low speed, a large energy loss in the torque converter undesirably lowers the energy efficiency. Even in a stationary driving state, the efficiency of power transmission in the torque converter is not 100%, and the fuel consumption rate in the known power output apparatus is thereby lower than that in a manual transmission.

In order to solve such problems, the applicants have proposed a system that does not include the fluid-based torque converter but has an engine, a planetary gear unit, a generator, a motor, and a battery and outputs the power from the motor to the drive shaft by utilizing the power output from the engine or electric power stored in the battery (JAPANESE PATENT LAYING-OPEN GAZETTE No. 50-30223). In this reference, however, there is no description of the technique of outputting a power in reverse of the rotation of the output shaft of the engine to the drive shaft with the power output from the engine.

SUMMARY OF THE INVENTION

One object of the present invention is to provide a power output apparatus for outputting power from an engine to a drive shaft with a high efficiency, as well as a method of controlling such a power output apparatus.

Another object of the present invention is to output a power in reverse of the rotation of the output shaft of the engine to the drive shaft with the power output from the engine.

At least part of the above and the other related objects is realized by a first power output apparatus of the present invention for outputting power to a drive shaft, the first power output apparatus comprises: an engine having an output shaft; a first motor having a rotating shaft and inputting and outputting power to and from the rotating shaft; a second motor inputting and outputting power to and from the drive shaft; three shaft-type power input/output means having three shafts respectively linked with the drive shaft, the output shaft, and the rotating shaft, the three shaft-type power input/output means inputting and outputting power to and from a residual one shaft, based on predetermined powers input to and output from any two shafts among the three shafts; and control means for, in response to a predetermined driving requirement, controlling the engine and the first motor in order to enable a power to be output to the drive shaft via the three shaft-type power input/output means, and controlling the second motor in order to enable the second motor to output a power having a greater magnitude than and an opposite direction to the power output to the drive shaft via the three shaft-type power input/output means through the control of the engine and the first motor.

The 'power' herein implies energy expressed as the product of a torque acting on an axis and a revolving speed of the axis. Even when the magnitude of the energy is identical, different torque and revolving speed results in a different power.

In the first power output apparatus of the present invention, the second motor outputs a power, which has a greater magnitude than and an opposite direction to the power output to the drive shaft via the three shaft-type power input/output means through the control of the engine and the first motor, to the drive shaft. As a whole, a power acting in reverse of a rotation of the output shaft of the engine is output to the drive shaft. The drive shaft can thus be driven and rotated in reverse of the rotation of the output shaft of the engine. Part of or all of the electric power consumed by the second motor is supplied by the electric power regenerated by the first motor.

In accordance with one aspect of the first power output apparatus, wherein the control means comprises means for carrying out the control, in order to enable a power output from the engine to be subjected to a torque conversion and output to the drive shaft. This structure enables the drive shaft to be driven and rotated in reverse of the rotation of the output shaft of the engine with the power output from the engine. In accordance with one aspect of this structure, the first power output apparatus further comprises target power setting means for setting a target power to be output to the drive shaft; wherein the control means comprises means for, when the predetermined driving requirement represents that the target power setting means has set a power acting in reverse of a rotation of the output shaft of the engine as the target power, controlling operation of the engine in order to enable energy corresponding to the target power to be output from the engine, and controlling the first motor and the second motor in order to enable the power output from the engine to be converted to the target power and output to the drive shaft. This structure enables the power output from the engine to be converted to a target power, which acts in reverse of the rotation of the output shaft of the engine and is set in response to an instruction of a driver, and output to the drive shaft.

In accordance with another aspect of the first power output apparatus, the first power output apparatus further comprises storage battery means being charged with an electric power output from the first motor, being discharged to supply an electric power input to the first motor, being charged with an electric power output from the second motor, and being discharged to supply an electric power input to the second motor; wherein the control means comprises means for controlling the engine, the first motor, and the second motor, in order to enable a total energy of a power output from the engine and an electric power input to and output from the storage battery means to be converted and output to the drive shaft. This structure enables the drive shaft to be driven and rotated in reverse of the rotation of the output shaft of the engine while charging or discharging the storage battery means. In accordance with one aspect of this structure, the first power output apparatus further comprises charging state detection means for detecting a charging state of the storage battery means; wherein the control means comprises means for carrying out the control in order to enable the charging state of the storage battery means detected by the charging state detection means to be within a predetermined range. The charging state of the storage battery means can be kept in the predetermined range. In accordance with one aspect of this structure, the first power output apparatus further comprises target power setting means for setting a target power to be output to the drive shaft; wherein the control means comprises means for, when the charging state of the storage battery means detected by the charging state detection means is less than the predetermined range, controlling the engine in order to enable output of an energy greater than a specific energy corresponding to the target power set by the target power setting means, and controlling the first motor and the second motor in order to enable the target power to be output to the drive shaft. This structure enables the target power to be output to the drive shaft while charging the storage battery means.

At least part of the above and the other related objects is realized by a second power output apparatus of the present invention for outputting power to a drive shaft, the second power output apparatus comprises: an engine having an output shaft; a first motor having a rotating shaft and inputting and outputting power to and from the rotating shaft; a second motor inputting and outputting power to and from the drive shaft; three shaft-type power input/output means having three shafts respectively linked with the drive shaft, the output shaft, and the rotating shaft, the three shaft-type power input/output means inputting and outputting power to and from a residual one shaft, based on predetermined powers input to and output from any two shafts among the three shafts; storage battery means being charged with an electric power output from the first motor, being discharged to supply an electric power input to the first motor, being charged with an electric power output from the second motor, and being discharged to supply an electric power input to the second motor; charging state detection means for detecting a charging state of the storage battery means; output source determination means for, in response to a predetermined driving requirement, determining whether an electric power stored in the storage battery means is used to output a specific power acting in reverse of a rotation of the output shaft of the engine to the drive shaft or a power output from the engine is converted to the specific power and output to the drive shaft, based on the charging state of the storage battery means detected by the charging state detection means; and control means for controlling the engine, the first motor, and the second motor, in order to enable the specific power acting in reverse of the rotation of the output shaft of the engine to be output to the drive shaft, based on a result of determination by the output source determination means.

The second power output apparatus of the present invention can convert the electric power stored in the storage battery means to a specific power acting in reverse of the rotation of the output shaft of the engine and output the specific power to the drive shaft, or alternatively convert the power output from the engine to the specific power acting in reverse of the rotation of the output shaft of the engine and output the specific power to the drive shaft, based on the charging state of the storage battery means.

At least part of the above and the other related objects is realized by a third power output apparatus of the present invention for outputting power to a drive shaft, the third power output apparatus comprises: an engine having an output shaft; a first motor having a rotating shaft and inputting and outputting power to and from the rotating shaft; a second motor inputting and outputting power to and from the drive shaft; three shaft-type power input/output means having three shafts respectively linked with the drive shaft, the output shaft, and the rotating shaft, the three shaft-type power input/output means inputting and outputting power to and from a residual one shaft, based on predetermined powers input to and output from any two shafts among the three shafts; and reverse transmission means disposed on the output shaft of the engine for reversing a rotating power of the output shaft and transmitting the reversed rotating power to a subsequent constituent, in response to a predetermined reversing requirement.

The third power output apparatus of the present invention enables the power output from the engine to be transmitted as a power of reverse direction to a subsequent constituent, that is, the three shaft-type power input/output means. This structure allows the power acting in reverse of the rotation of the output shaft of the engine to be output to the drive shaft. The power of a fixed magnitude can thus be output to the drive shaft, irrespective of the direction of rotation of the drive shaft.

At least part of the above and the other related objects is realized by a fourth power output apparatus of the present invention for outputting power to a drive shaft, the fourth power output apparatus comprises: an engine having an output shaft; a first motor having a rotating shaft and inputting and outputting power to and from the rotating shaft; a second motor inputting and outputting power to and from the drive shaft; three shaft-type power input/output means having three shafts respectively linked with the drive shaft, the output shaft, and the rotating shaft, the three shaft-type power input/output means inputting and outputting power to and from a residual one shaft, based on predetermined powers input to and output from any two shafts among the three shafts; and reverse transmission means disposed on the drive shaft for reversing a rotating power of the drive shaft and transmitting the reversed rotating power to a subsequent constituent, in response to a predetermined reversing requirement.

The fourth power output apparatus of the present invention outputs a power of reverse direction to the drive shaft via the three shaft-type power input/output means, and thereby enables the power acting in reverse of the rotation of the output shaft of the engine to be eventually output to the drive shaft. The power of a fixed magnitude can thus be output to the drive shaft, irrespective of the direction of rotation of the drive shaft.

At least part of the above and the other related objects is realized by a first method of controlling a power output apparatus for outputting power to a drive shaft, the first method comprises the steps of: (a) providing (1) an engine having an output shaft, (2) a first motor having a rotating shaft and inputting and outputting power to and from the rotating shaft, (3) a second motor inputting and outputting power to and from the drive shaft, and (4) three shaft-type power input/output means having three shafts respectively linked with the drive shaft, the output shaft, and the rotating shaft, the three shaft-type power input/output means inputting and outputting power to and from a residual one shaft, based on predetermined powers input to and output from any two shafts among the three shafts; (b) controlling the engine and the first motor in order to enable a power to be output to the drive shaft via the three shaft-type power input/output means; and (c) controlling the second motor in order to enable the second motor to output a power having a greater magnitude than and an opposite direction to the power output to the drive shaft via the three shaft-type power input/output means through the control of the engine and the first motor.

In the first method of controlling the power output apparatus of the present invention, the second motor outputs a power, which has a greater magnitude than and an opposite direction to the power output to the drive shaft via the three shaft-type power input/output means through the control of the engine and the first motor, to the drive shaft. As a whole, a power acting in reverse of a rotation of the output shaft of the engine is output to the drive shaft. The drive shaft can thus be driven and rotated in reverse of the rotation of the output shaft of the engine. Part of or all of the electric power consumed by the second motor is supplied by the electric power regenerated by the first motor.

At least part of the above and the other related objects is realized by a second method of controlling a power output apparatus for outputting power to a drive shaft, the second method comprises the steps of: (a) providing (1) an engine having an output shaft, (2) a first motor having a rotating shaft and inputting and outputting power to and from the rotating shaft, (3) a second motor inputting and outputting power to and from the drive shaft, (4) three shaft-type power input/output means having three shafts respectively linked with the drive shaft, the output shaft, and the rotating shaft, the three shaft-type power input/output means inputting and outputting power to and from a residual one shaft, based on predetermined powers input to and output from any two shafts among the three shafts, and (5) storage battery means being charged with an electric power output from the first motor, being discharged to supply an electric power input to the first motor, being charged with an electric power output from the second motor, and being discharged to supply an electric power input to the second motor; (b) setting a power acting in reverse of a rotation of the output shaft of the engine as a target power to be output to the drive shaft; (c) detecting a charging state of the storage battery means; and (d) when the charging state of the storage battery means detected in the step (c) is less than a predetermined range, controlling the engine in order to enable output of an energy greater than a specific energy corresponding to the target power set in the step (b), and controlling the first motor and the second motor in order to enable the target power to be output to the drive shaft.

The second method of controlling the power output apparatus of the present invention enables the target power, which is set as the power acting in reverse of the rotation of the output shaft of the engine, to be output to the drive shaft while charging the storage battery means.

At least part of the above and the other related objects is realized by a third method of controlling a power output apparatus for outputting power to a drive shaft, the third method comprises the steps of: (a) providing (1) an engine having an output shaft, (2) a first motor having a rotating shaft and inputting and outputting power to and from the rotating shaft, (3) a second motor inputting and outputting power to and from the drive shaft, (4) three shaft-type power input/output means having three shafts respectively linked with the drive shaft, the output shaft, and the rotating shaft, the three shaft-type power input/output means inputting and outputting power to and from a residual one shaft, based on predetermined powers input to and output from any two shafts among the three shafts, and (5) storage battery means being charged with an electric power output from the first motor, being discharged to supply an electric power input to the first motor, being charged with an electric power output from the second motor, and being discharged to supply an electric power input to the second motor; (b) detecting a charging state of the storage battery means; (c) when the charging state of the storage battery means detected in the step (b) is within a predetermined range, controlling the second motor in order to enable the second motor to utilize an electric power stored in the storage battery means and output a specific power acting in reverse of a rotation of the output shaft of the engine to the drive shaft; and (d) when the charging state of the storage battery means detected in the step (b) is less than the predetermined range, controlling the engine, the first motor, and the second motor in order to enable a power output from the engine to be converted to the specific power acting in reverse of the rotation of the output shaft of the engine and output to the drive shaft.

When the charging state of the storage battery means is within a predetermined range, the third method of controlling the power output apparatus of the present invention converts an electric power stored in the storage battery means to a specific power acting in reverse of the rotation of the output shaft of the engine and outputs the specific power to the drive shaft. When the charging state of the storage battery means is less than the predetermined range, a power output from the engine is converted to the specific power acting in reverse of the rotation of the output shaft of the engine and is output to the drive shaft.

These and other objects, features, aspects, and advantages of the present invention will become more apparent from the following detailed description of the preferred embodiments with the accompanying drawings.

DESCRIPTION OF THE PREFERRED EMBODIMENTS

Figure 1:
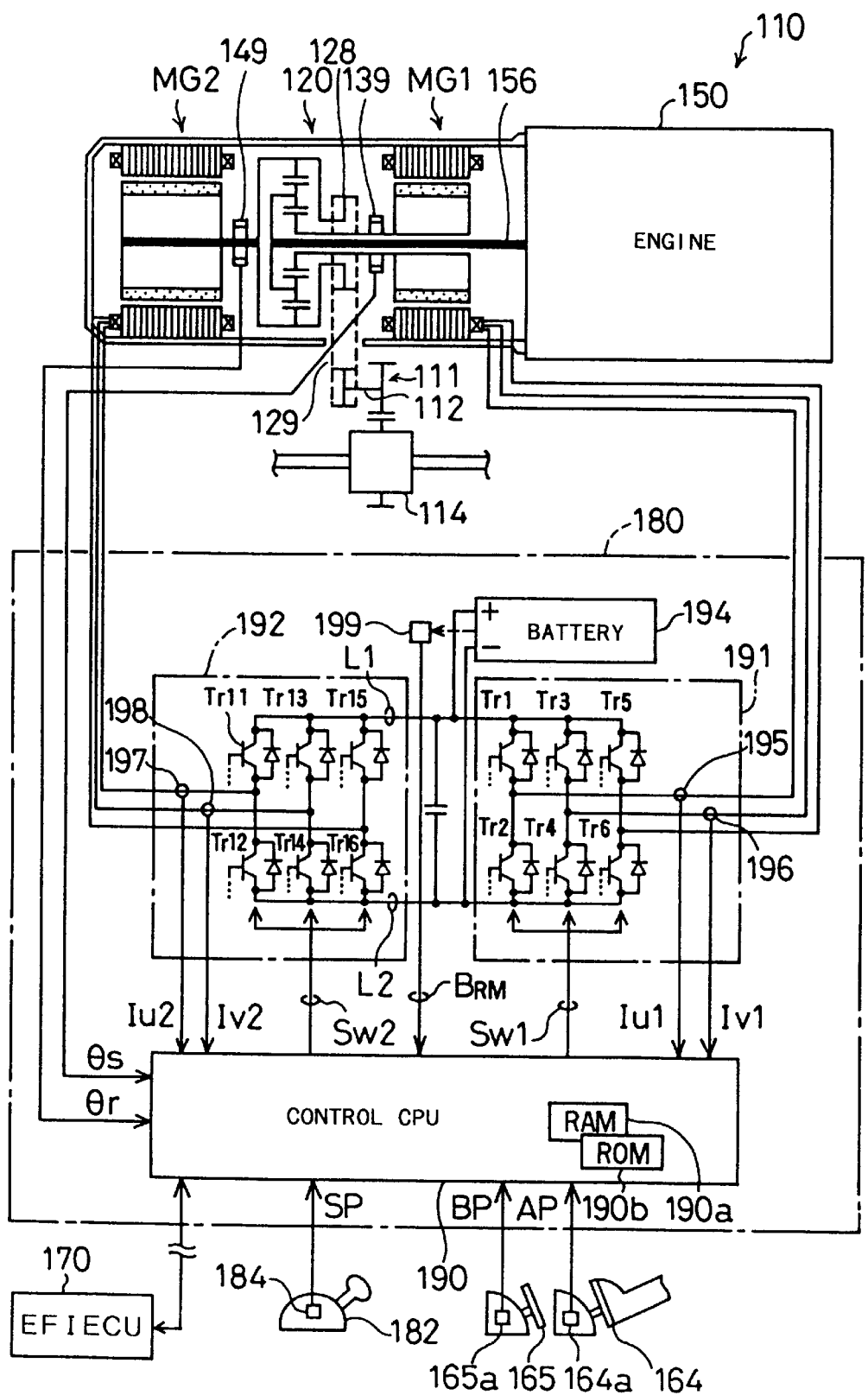
FIG. 1 schematically illustrates structure of a power output apparatus 110 embodying the present invention.
Figure 2:
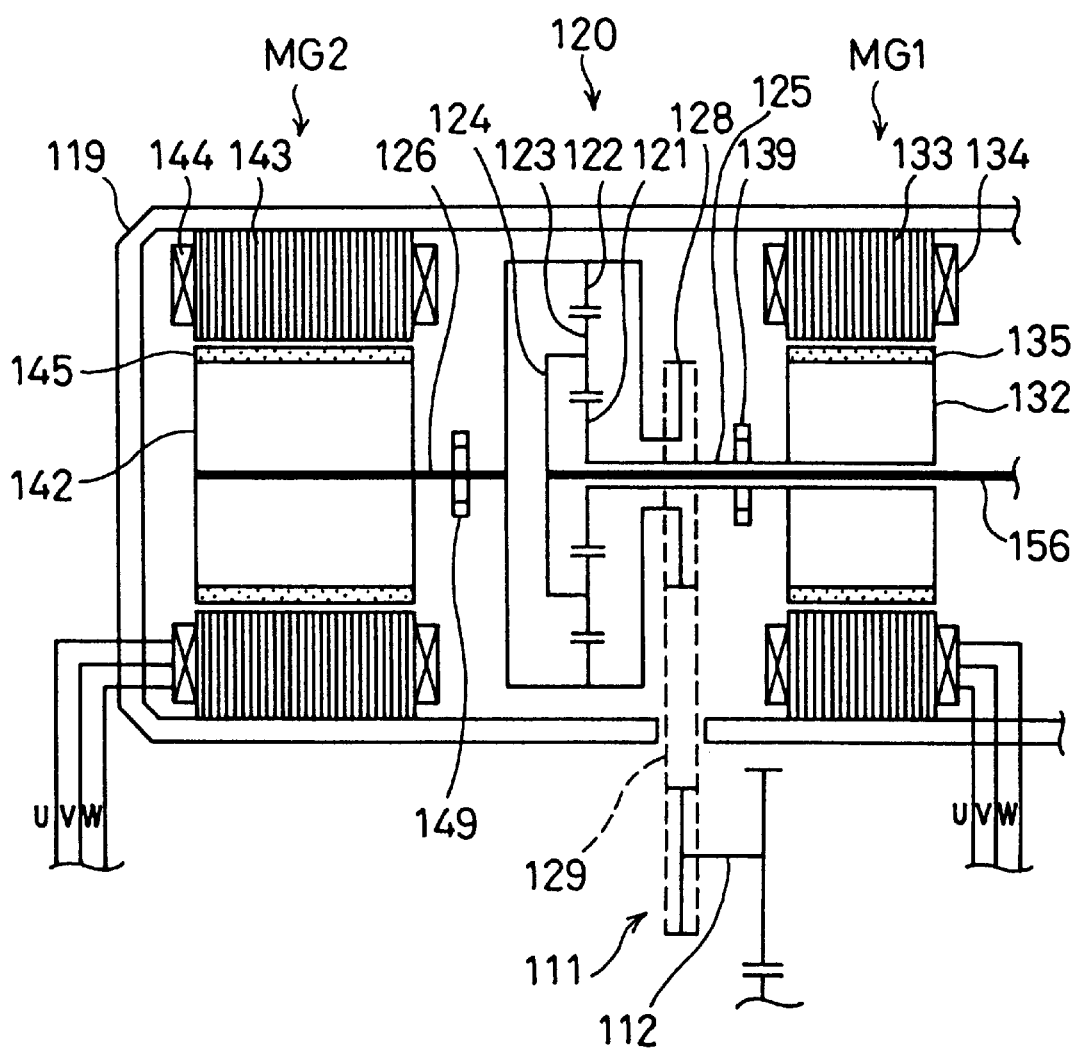
FIG. 2 is an enlarged view illustrating an essential part of the power output apparatus 110 of the embodiment.
Figure 3:
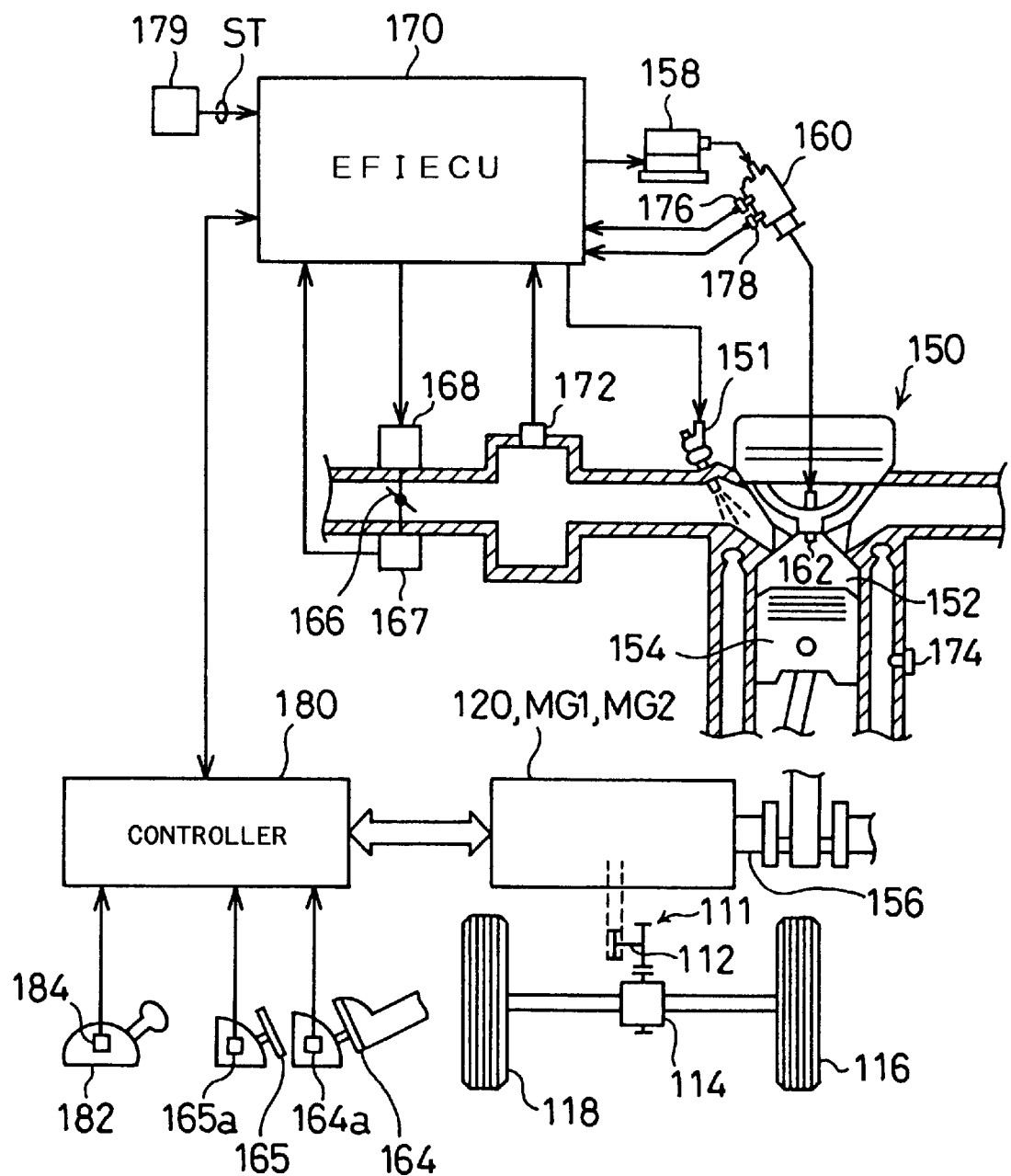
FIG. 3 schematically illustrates general structure of a vehicle with the power output apparatus 110 of the embodiment incorporated therein.

Some modes of carrying out the present invention are described as preferred embodiments. FIG. 1 schematically illustrates structure of a power output apparatus 110 embodying the present invention; FIG. 2 is an enlarged view illustrating an essential part of the power output apparatus 110 of the embodiment; and FIG. 3 schematically illustrates general structure of a vehicle with the power output apparatus 110 of the embodiment incorporated therein. The general structure of the vehicle is described first for the convenience of explanation.

Referring to FIG. 3, the vehicle is provided with an engine 150 which consumes gasoline as a fuel and outputs power. The air ingested from an air supply system via a throttle valve 166 is mixed with a fuel, that is, gasoline in this embodiment, injected from a fuel injection valve 151. The air/fuel mixture is supplied into a combustion chamber 152 to be explosively ignited and burned. Linear motion of a piston 154 pressed down by the explosion of the air/fuel mixture is converted to rotational motion of a crankshaft 156. The throttle valve 166 is driven to open and close by an actuator 168. An ignition plug 162 converts a high voltage applied from an igniter 158 via a distributor 160 to a spark, which explosively ignites and combusts the air/fuel mixture.

Operation of the engine 150 is controlled by an electronic control unit (hereinafter referred to as EFIECU) 170. The EFIECU 170 receives information from various sensors, which detect operating conditions of the engine 150. These sensors include a throttle valve position sensor 167 for detecting a valve travel or position of the throttle valve 166, a manifold vacuum sensor 172 for measuring a load applied to the engine 150, a water temperature sensor 174 for measuring the temperature of cooling water in the engine 150, and a speed sensor 176 and an angle sensor 178 mounted on the distributor 160 for measuring the revolving speed (the number of revolutions per a predetermined time period) and the rotational angle of the crankshaft 156. A starter switch 179 for detecting a starting condition ST of an ignition key (not shown) is also connected to the EFIECU 170. Other sensors and switches connecting with the EFIECU 170 are omitted from the illustration.

The crankshaft 156 of the engine 150 is mechanically linked with a power transmission gear 111, which has a drive shaft 112 as a rotating axis, via a planetary gear 120 and first and second motors MG1 and MG2 (described later in detail). The power transmission gear 111 is further linked with a differential gear 114, so that the power output from the power output apparatus 110 is eventually transmitted to left and right driving wheels 116 and 118. The first motor MG1 and the second motor MG2 are electrically connected to and controlled by a controller 180. The controller 180 includes an internal control CPU and receives inputs from a gearshift position sensor 184 attached to a gearshift 182, an accelerator position sensor 164a attached to an accelerator pedal 164, and a brake pedal position sensor 165a attached to a brake pedal 165, as described later in detail. The controller 180 sends and receives a variety of data and information to and from the EFIECU 170 through communication. Details of the control procedure including a communication protocol will be described later.

Referring to FIGS. 1 and 2, the power output apparatus 110 of the embodiment primarily includes the engine 150, the planetary gear 120 having a planetary carrier 124 mechanically linked with the crankshaft 156 of the engine 150, the first motor MG1 linked with a sun gear 121 of the planetary gear 120, the second motor MG2 linked with a ring gear 122 of the planetary gear 120, and the controller 180 for driving and controlling the first and the second motors MG1 and MG2.

The following describes structure of the planetary gear 120 and the first and the second motors MG1 and MG2 based on the drawing of FIG. 2. The planetary gear 120 includes the sun gear 121 linked with a hollow sun gear shaft 125 which the crankshaft 156 passes through, the ring gear 122 linked with a ring gear shaft 126 coaxial with the crankshaft 156, a plurality of planetary pinion gears 123 arranged between the sun gear 121 and the ring gear 122 to revolve around the sun gear 121 while rotating on its axis, and the planetary carrier 124 connecting with one end of the crankshaft 156 to support the rotating shafts of the planetary pinion gears 123. In the planetary gear 120, three shafts, that is, the sun gear shaft 125, the ring gear shaft 126, and the crankshaft 156 respectively connecting with the sun gear 121, the ring gear 122, and the planetary carrier 124, work as input and output shafts of the power. Determination of the powers input to and output from any two shafts among the three shafts automatically determines the power input to and output from the residual one shaft. The details of the input and output operations of the power into and from the three shafts of the planetary gear 120 will be discussed later.

A power feed gear 128 for taking out the power is linked with the ring gear 122 and arranged on the side of the first motor MG1. The power feed gear 128 is further connected to the power transmission gear 111 via a chain belt 129, so that the power is transmitted between the power feed gear 128 and the power transmission gear 111.

The first motor MG1 is constructed as a synchronous motor-generator and includes a rotor 132 having a plurality of permanent magnets 135 on its outer surface and a stator 133 having three-phase coils 134 wound thereon to form a revolving magnetic field. The rotor 132 is linked with the sun gear shaft 125 connecting with the sun gear 121 of the planetary gear 120. The stator 133 is prepared by laying thin plates of non-directional electromagnetic steel one upon another and is fixed to a casing 119. The first motor MG1 works as a motor for rotating the rotor 132 through the interaction between a magnetic field produced by the permanent magnets 135 and a magnetic field produced by the three-phase coils 134, or as a generator for generating an electromotive force on either ends of the three-phase coils 134 through the interaction between the magnetic field produced by the permanent magnets 135 and the rotation of the rotor 132. The sun gear shaft 125 is further provided with a resolver 139 for measuring its rotational angle $\theta$s.

Like the first motor MG1, the second motor MG2 is also constructed as a synchronous motor-generator and includes a rotor 142 having a plurality of permanent magnets 145 on its outer surface and a stator 143 having three-phase coils 144 wound thereon to form a revolving magnetic field. The rotor 142 is linked with the ring gear shaft 126 connecting with the ring gear 122 of the planetary gear 120, whereas the stator 14 is fixed to the casing 119. The stator 143 of the motor MG2 is also produced by laying thin plates of non-directional electromagnetic steel one upon another. Like the first motor MG1, the second motor MG2 also works as a motor or a generator. The ring gear shaft 126 is further provided with a resolver 149 for measuring its rotational angle $\theta$r.

The controller 180 for driving and controlling the first and the second motor MG1 and MG2 has the following configuration. Referring back to FIG. 1, the controller 180 includes a first driving circuit 191 for driving the first motor MG1, a second driving circuit 192 for driving the second motor MG2, a control CPU 190 for controlling both the first and the second driving circuits 191 and 192, and a battery 194 including a number of secondary cells. The control CPU 190 is a one-chip microprocessor including a RAM 190a used as a working memory, a ROM 190b in which various control programs are stored, an input/output port (not shown), and a serial communication port (not shown) through which data are sent to and received from the EFIECU 170. The control CPU 190 receives a variety of data via the input port. The input data include a rotational angle $\theta$s of the sun gear shaft 125 measured with the resolver 139, a rotational angle $\theta$r of the ring gear shaft 126 measured with the resolver 149, an accelerator pedal position AP (step-on amount of the accelerator pedal 164) output from the accelerator position sensor 164a, a brake pedal position BP (step-on amount of the brake pedal 165) output from the brake pedal position sensor 165a, a gearshift position SP output from the gearshift position sensor 184, values of currents Iu1 and Iv1 from two ammeters 195 and 196 disposed in the first driving circuit 191, values of currents Iu2 and Iv2 from two ammeters 197 and 198 disposed in the second driving circuit 192, and a remaining charge BRM of the battery 194 measured with a remaining charge meter 199. The remaining charge meter 199 may determine the remaining charge BRM of the battery 194 by any known method; for example, by measuring the specific gravity of an electrolytic solution in the battery 194 or the whole weight of the battery 194, by computing the currents and time of charge and discharge, or by causing an instantaneous short circuit between terminals of the battery 194 and measuring an internal resistance against the electric current.

The control CPU 190 outputs a first control signal SW1 for driving six transistors Tr1 through Tr6 working as switching elements of the first driving circuit 191 and a second control signal SW2 for driving six transistors Tr11 through Tr16 working as switching elements of the second driving circuit 192. The six transistors Tr1 through Tr6 in the first driving circuit 191 constitute a transistor inverter and are arranged in pairs to work as a source and a drain with respect to a pair of power lines L1 and L2. The three-phase coils (U, V, W) 134 of the first motor MG1 are connected to the respective contacts of the paired transistors in the first driving circuit 191. The power lines L1 and L2 are respectively connected to plus and minus terminals of the battery 194. The control signal SW1 output from the control CPU 190 thus successively controls the power-on time of the paired transistors Tr1 through Tr6. The electric currents flowing through the three-phase coils 134 undergo PWM (pulse width modulation) control to give quasi-sine waves, which enable the three-phase coils 134 to form a revolving magnetic field.

The six transistors Tr11 through Tr16 in the second driving circuit 192 also constitute a transistor inverter and are arranged in the same manner as the transistors Tr1 through Tr6 in the first driving circuit 191. The three-phase coils (U, V, W) 144 of the second motor MG2 are connected to the respective contacts of the paired transistors in the second driving circuit 191. The second control signal Sw2 output from the control CPU 190 thus successively controls the power-on time of the paired transistors Tr11 through Tr16. The electric currents flowing through the three-phase coils 144 undergo PWM control to give quasi-sine waves, which enable the three-phase coils 144 to form a revolving magnetic field.

Figure 4:
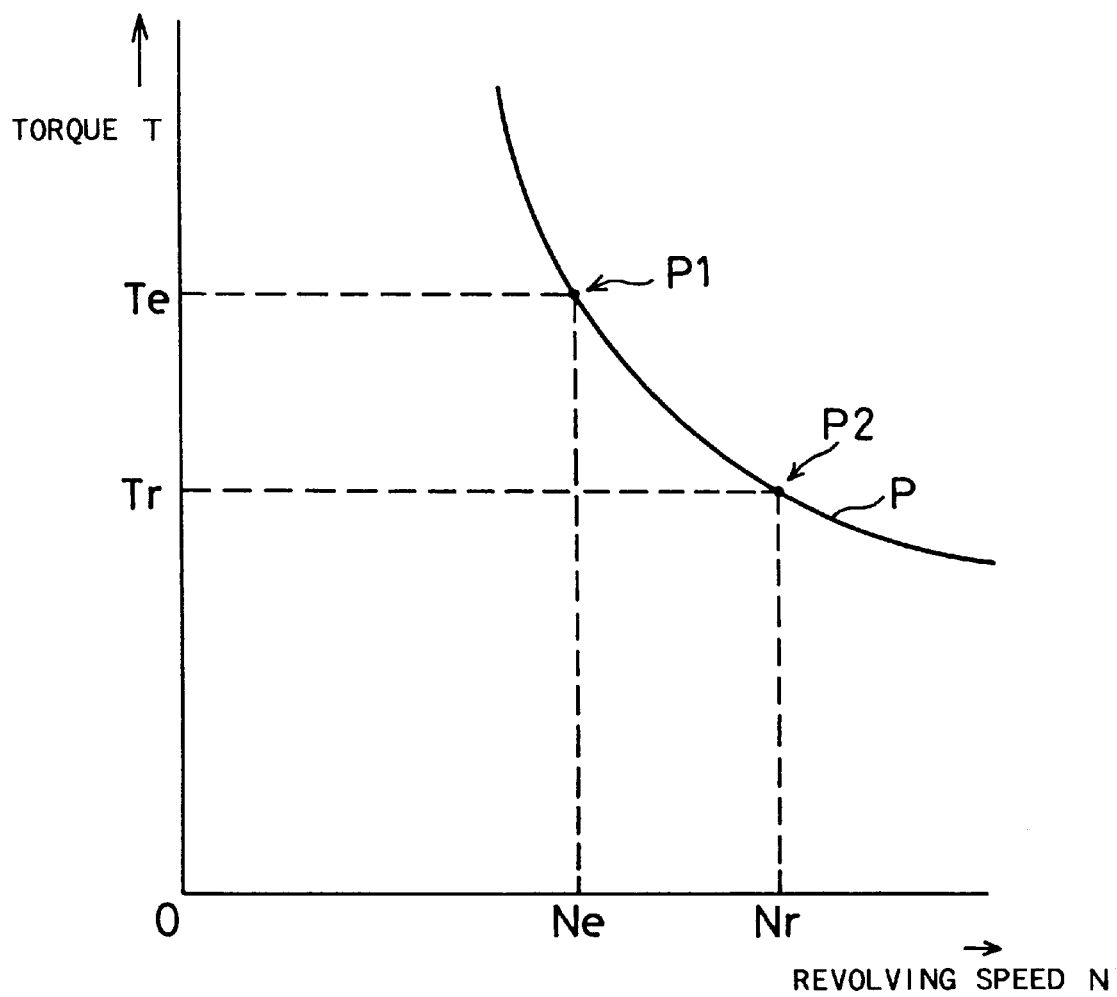
FIG. 4 is a graph showing the operation principle of the power output apparatus 110 of the embodiment.

The power output apparatus 110 of the embodiment thus constructed works in accordance with the operation principles discussed below, especially with the principle of torque conversion. By way of example, it is assumed that the engine 150 is driven at a driving point P1 of the revolving speed Ne and the torque Te and that the ring gear shaft 126 is driven at another driving point P2, which is defined by another revolving speed Nr and another torque Tr but gives an amount of energy identical with an energy Pe output from the engine 150. This means that the power output from the engine 150 is subjected to torque conversion and applied to the ring gear shaft 126. The relationship between the torque and the revolving speed of the engine 150 and the ring gear shaft 126 under such conditions is shown in the graph of FIG. 4.

Figure 5:
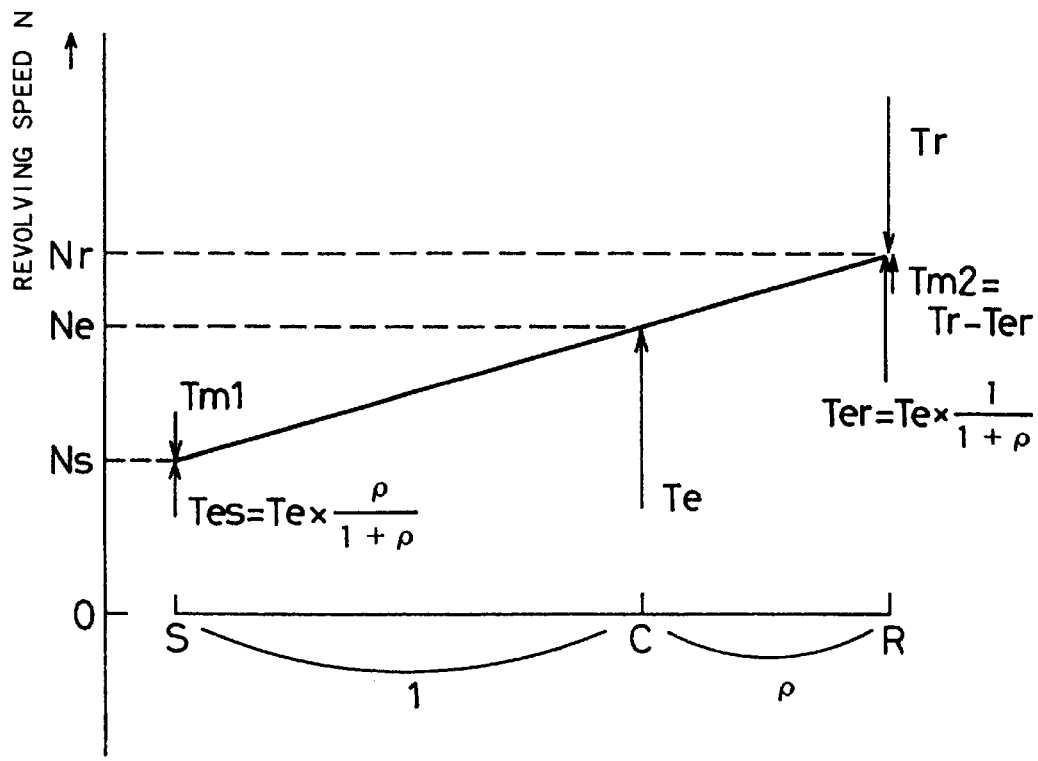
FIG. 5 is a nomogram showing the relationship between the revolving speed and the torque on the three shafts linked with the planetary gear 120 in the power output apparatus 110 of the embodiment.
Figure 6:
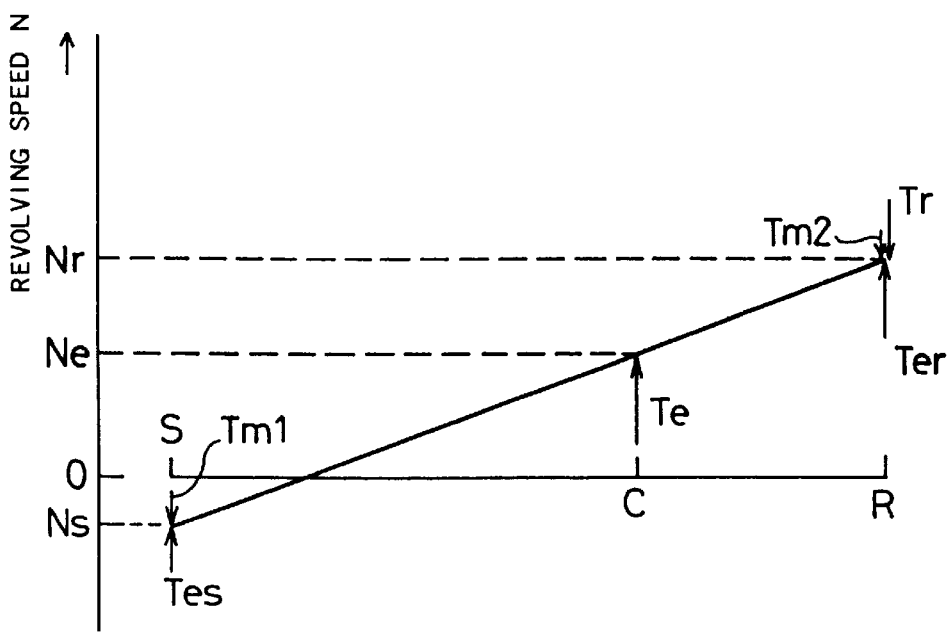
FIG. 6 is a nomogram showing the relationship between the revolving speed and the torque on the three shafts linked with the planetary gear 120 in the power output apparatus 110 of the embodiment.

According to the mechanics, the relationship between the revolving speed and the torque of the three shafts in the planetary gear 120 (that is, the sun gear shaft 125, the ring gear shaft 126, and the planetary carrier 124 (crankshaft 156)) can be expressed as nomograms illustrated in FIGS. 5 and 6 and solved geometrically. The relationship between the revolving speed and the torque of the three shafts in the planetary gear 120 may be analyzed numerically through calculation of energies of the respective shafts, without using the nomograms. For the clarity of explanation, the nomograms are used in this embodiment.

In the nomogram of FIG. 5, the revolving speed of the three shafts is plotted as ordinate and the positional ratio of the coordinate axes of the three shafts as abscissa. When a coordinate axis S of the sun gear shaft 125 and a coordinate axis R of the ring gear shaft 126 are positioned on either ends of a line segment, a coordinate axis C of the planetary carrier 124 is given as an interior division of the axes S and R at the ratio of 1 to $\rho$, where $\rho$ represents a ratio of the number of teeth of the sun gear 121 to the number of teeth of the ring gear 122 and expressed as Equation (1) given below:

$$\rho = \frac{\text{the number of teeth of the sun gear}}{\text{the number of teeth of the ring gear}} \quad (1)$$

As mentioned above, the engine 150 is driven at the revolving speed Ne, while the ring gear shaft 126 is driven at the revolving speed Nr. The revolving speed Ne of the engine 150 can thus be plotted on the coordinate axis C of the planetary carrier 124 linked with the crankshaft 156 of the engine 150, and the revolving speed Nr of the ring gear shaft 126 on the coordinate axis R of the ring gear shaft 126. A straight line passing through both the points is drawn, and a revolving speed Ns of the sun gear shaft 125 is then given as the intersection of this straight line and the coordinate axis S. This straight line is hereinafter referred to as a dynamic collinear line. The revolving speed Ns of the sun gear shaft 125 can be calculated from the revolving speed Ne of the engine 150 and the revolving speed Nr of the ring gear shaft 126 according to a proportional expression given as Equation (2) below. In the planetary gear 120, the determination of the rotations of the two gears among the sun gear 121, the ring gear 122, and the planetary carrier 124 results in automatically setting the rotation of the residual one gear.

$$Ns = Nr - (Nr - Ne)\frac{1+\rho}{\rho} \quad (2)$$

The torque Te of the engine 150 is then applied (upward in the drawing) to the dynamic collinear line on the coordinate axis C of the planetary carrier 124 functioning as a line of action. The dynamic collinear line against the torque can be regarded as a rigid body to which a force is applied as a vector. Based on the technique of dividing the force into two different parallel lines of action, the torque Te acting on the coordinate axis C is divided into a torque Tes on the coordinate axis S and a torque Ter on the coordinate axis R. The magnitudes of the torques Tes and Ter are given by Equations (3) and (4) below:

$$Tes = Te \times \frac{\rho}{1+\rho} \quad (3)$$

$$Ter = Te \times \frac{1}{1+\rho} \quad (4)$$

The equilibrium of forces on the dynamic collinear line is essential for the stable state of the dynamic collinear line. In accordance with a concrete procedure, a torque Tm1 having the same magnitude as but the opposite direction to the torque Tes is applied to the coordinate axis S, whereas a torque Tm2 having the same magnitude as but the opposite direction to a resultant force of the torque Ter and the torque that has the same magnitude as but the opposite direction to the torque Tr output to the ring gear shaft 126 is applied to the coordinate axis R. The torque Tm1 is given by the first motor MG1, and the torque Tm2 by the second motor MG2. The first motor MG1 applies the torque Tm1 in reverse of its rotation and thereby works as a generator to regenerate an electrical energy Pm1, which is given as the product of the torque Tm1 and the revolving speed Ns, from the sun gear shaft 125. The second motor MG2 applies the torque Tm2 in the direction of its rotation and thereby works as a motor to output an electrical energy Pm2, which is given as the product of the torque Tm2 and the revolving speed Nr, as a power to the ring gear shaft 126.

In case that the electrical energy Pm1 is identical with the electrical energy Pm2, all the electric power consumed by the second motor MG2 can be regenerated and supplied by the first motor MG1. In order to attain such a state, all the input energy should be output; that is, the energy Pe output from the engine 150 should be equal to an energy Pr output to the ring gear shaft 126. Namely the energy Pe expressed as the product of the torque Te and the revolving speed Ne is made equal to the energy Pr expressed as the product of the torque Tr and the revolving speed Nr. Referring to FIG. 4, the power that is expressed as the product of the torque Te and the revolving speed Ne and output from the engine 150 driven at the driving point P1 is subjected to torque conversion and output to the ring gear shaft 126 as the power of the same energy but expressed as the product of the torque Tr and the revolving speed Nr. As discussed previously, the power output to the ring gear shaft 126 is transmitted to a drive shaft 112 via the power feed gear 128 and the power transmission gear 111, and further transmitted to the driving wheels 116 and 118 via the differential gear 114. A linear relationship is accordingly held between the power output to the ring gear shaft 126 and the power transmitted to the driving wheels 116 and 118. The power transmitted to the driving wheels 116 and 118 can thus be controlled by adjusting the power output to the ring gear shaft 126.

Although the revolving speed Ns of the sun gear shaft 125 is positive in the nomogram of FIG. 5, it may be negative according to the revolving speed Ne of the engine 150 and the revolving speed Nr of the ring gear shaft 126 as shown in the nomogram of FIG. 6. In the latter case, the first motor MG1 applies the torque in the direction of its rotation and thereby works as a motor to consume the electrical energy Pm1 given as the product of the torque Tm1 and the revolving speed Ns. The second motor MG2, on the other hand, applies the torque in reverse of its rotation and thereby works as a generator to regenerate the electrical energy Pm2, which is given as the product of the torque Tm2 and the revolving speed Nr, from the ring gear shaft 126. In case that the electrical energy Pm1 consumed by the first motor MG1 is made equal to the electrical energy Pm2 regenerated by the second motor MG2 under such conditions, all the electric power consumed by the first motor MG1 can be supplied by the second motor MG2.

The above description refers to the fundamental torque conversion in the power output apparatus 110 of the embodiment. The power output apparatus 110 can, however, perform other operations as well as the above fundamental operation that carries out the torque conversion for all the power output from the engine 150 and outputs the converted torque to the ring gear shaft 126. The possible operations include an operation of charging the battery 194 with the surplus electrical energy and an operation of supplementing an insufficient electrical energy with the electric power stored in the battery 194. These operations are implemented by regulating the power output from the engine 150 (that is, the product of the torque Te and the revolving speed Ne), the electrical energy Pm1 regenerated or consumed by the first motor MG1, and the electrical energy Pm2 regenerated or consumed by the second motor MG2.

The operation principle discussed above is on the assumption that the efficiency of power conversion by the planetary gear 120, the motors MG1 and MG2, and the transistors Tr1 through Tr16 is equal to the value '1', which represents 100%. In the actual state, however, the conversion efficiency is less than the value '1', and it is required to make the energy Pe output from the engine 150 a little greater than the energy Pr output to the ring gear shaft 126 or alternatively to make the energy Pr output to the ring gear shaft 126 a little smaller than the energy Pe output from the engine 150. By way of example, the energy Pe output from the engine 150 may be calculated by multiplying the energy Pr output to the ring gear shaft 126 by the reciprocal of the conversion efficiency. In the state of the nomogram of FIG. 5, the torque Tm2 of the second motor MG2 may be calculated by multiplying the electric power regenerated by the first motor MG1 by the efficiencies of both the motors MG1 and MG2. In the state of the nomogram of FIG. 6, on the other hand, the torque Tm2 of the second motor MG2 may be calculated by dividing the electric power consumed by the first motor MG1 by the efficiencies of both the motors MG1 and MG2. In the planetary gear 120, there is an energy loss or heat loss due to a mechanical friction or the like, though the amount of energy loss is significantly small, compared with the whole amount of energy concerned. The efficiency of the synchronous motors used as the first and the second motors MG1 and MG2 is very close to the value '1'. Known devices such as GTOs applicable to the transistors Tr1 through Tr16 have extremely small ON-resistance. The efficiency of power conversion is thus practically equal to the value '1'. For the matter of convenience, in the following discussion of the embodiment, the efficiency is considered equal to the value '1' (=100%), unless otherwise specified.

The power output apparatus 110 of the embodiment drives and rotates the ring gear shaft 126 in reverse of the rotation of the crankshaft 156, that is, moves the vehicle back, by the second motor MG2 with the electrical energy stored in the battery 194 or alternatively through the torque conversion of the power output from the engine 150.

Figure 7:
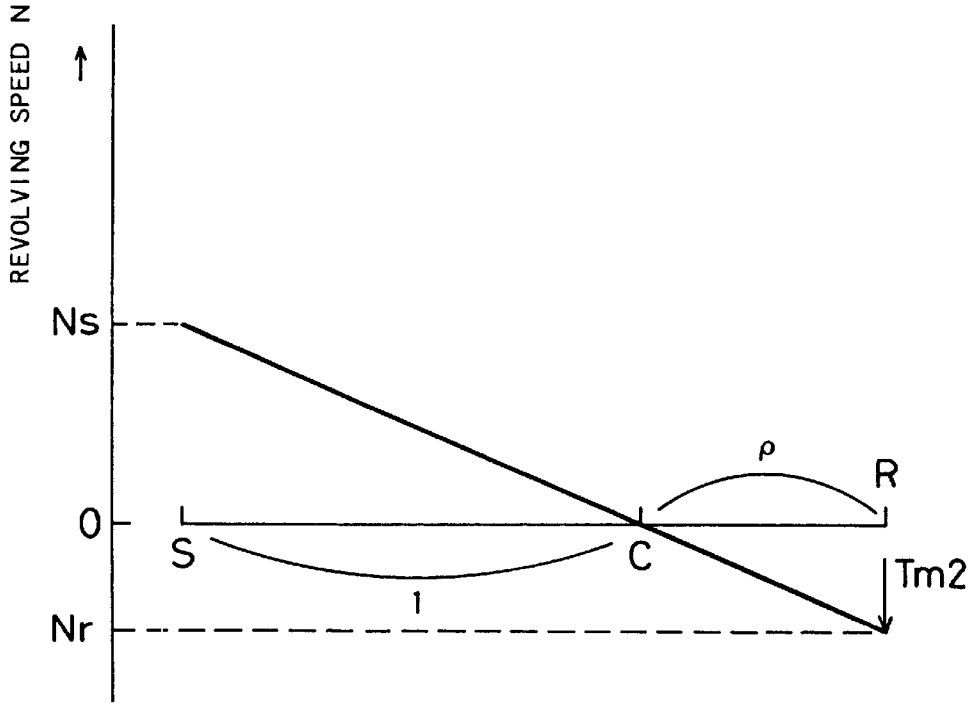
FIG. 7 is a nomogram showing the state when only the power in a reverse direction output from the second motor MG2 is output to the ring gear shaft 126.

While the engine 150 is at a stop and the torque Tm1 of the first motor MG1 is set equal to zero, the second motor MG2 uses the electrical energy stored in the battery 194 and outputs the power to the ring gear shaft 126, so as to enable the vehicle to move back. Under these conditions, the dynamic collinear line is stably kept in the state having the least sum of the energy required for racing the engine 150 and the energy required for racing the first motor MG1. Since the engine 150 is a four-cycle gasoline engine in the power output apparatus 110 of the embodiment, the energy required for racing the engine 150, that is, the energy required for friction and compression of the piston in the engine 150, is greater than the energy required for racing the rotor 132 of the first motor MG1. The dynamic collinear line is accordingly in the state of stopping the engine 150 and racing the first motor MG1 as shown in the nomogram of FIG. 7.

Figure 8:
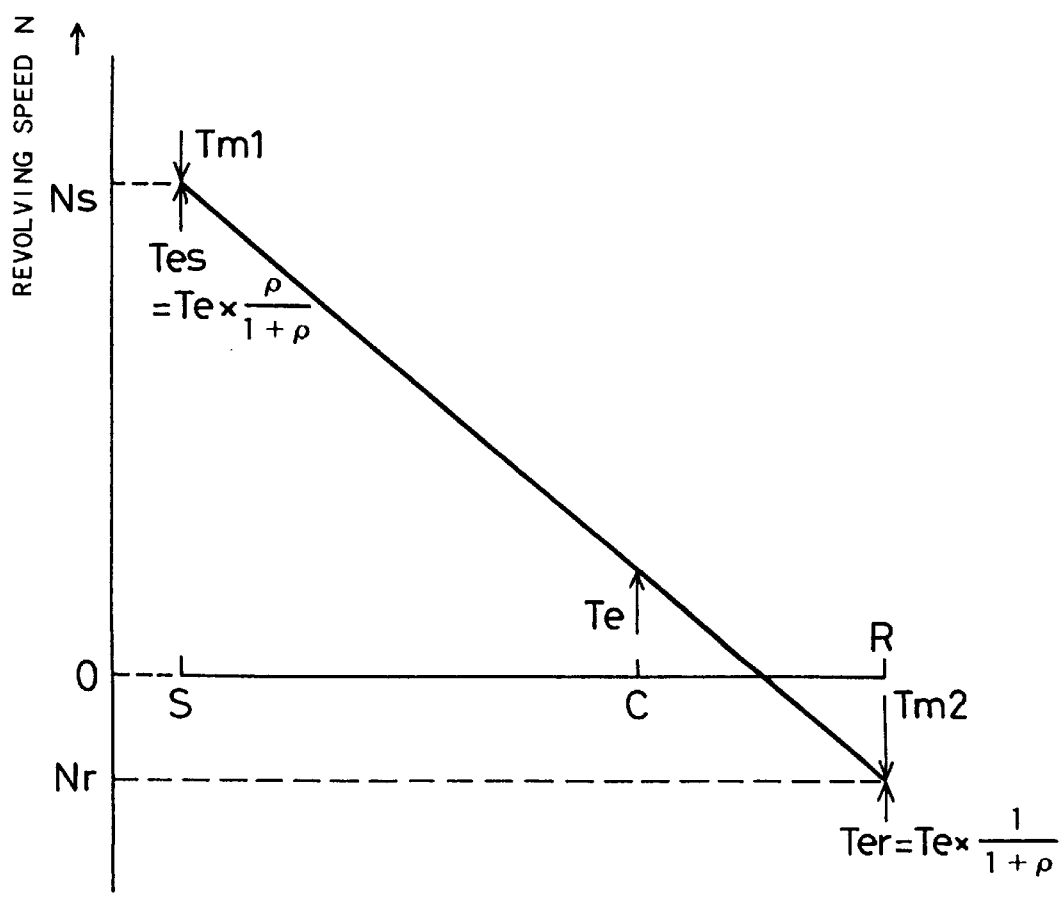
FIG. 8 is a nomogram showing the state when the power output from the engine 150 is converted to power in a reverse direction and the converted power is output to the ring gear shaft 126.

The operation of moving the vehicle back through the torque conversion of the power output from the engine 150 is implemented, on the other hand, by applying the negative values of the revolving speed Nr of the ring gear shaft 126 and the torque Tm2 of the second motor MG2 to the operations discussed in the nomograms of FIGS. 5 and 6. FIG. 8 is a nomogram in this state. The torque acting at the coordinate axis C and the torque acting at the coordinate axis S on the dynamic collinear line in the nomogram of FIG. 8 are identical with those explained in the nomograms of FIGS. 5 and 6. The divisional torque Ter is applied to the coordinates axis R on the dynamic collinear line, while the torque Te is output from the engine 150 to the coordinate axis C. Application of a torque having a greater magnitude than but an opposite direction to the torque Ter enables a negative torque (that is, a torque in reverse of the rotation of the crankshaft 156) to act on the ring gear shaft 126. Namely the second motor MG2 is required to output a negative torque having the magnitude greater than that of the torque Ter.

At this moment, the first motor MG1 applies the torque in reverse of the rotation of the sun gear shaft 125 and thereby functions as a generator, whereas the second motor MG2 outputs the torque in the direction of rotation of the ring gear shaft 126 and thereby functions as a motor. When the electrical energy Pm1 regenerated by the first motor MG1 is identical with the electrical energy Pm2 consumed by the second motor MG2, the power output from the engine 150 can be converted to the power of negative rotation and output to the ring gear shaft 126. When the electrical energy Pm1 regenerated by the first motor MG1 is greater than the electrical energy Pm2 consumed by the second motor MG2, the battery 194 can be charged with the surplus electrical energy. When the electrical energy Pm1 regenerated by the first motor MG1 is smaller than the electrical energy Pm2 consumed by the second motor MG2, electric power can be discharged from the battery 194 to supplement the insufficient electrical energy. In this manner, the power output apparatus 110 of the embodiment can control the remaining charge BRM of the battery 194 by regulating the electrical energy Pm1 regenerated by the first motor MG1 and the electrical energy Pm2 consumed by the second motor MG2.

Figure 9:
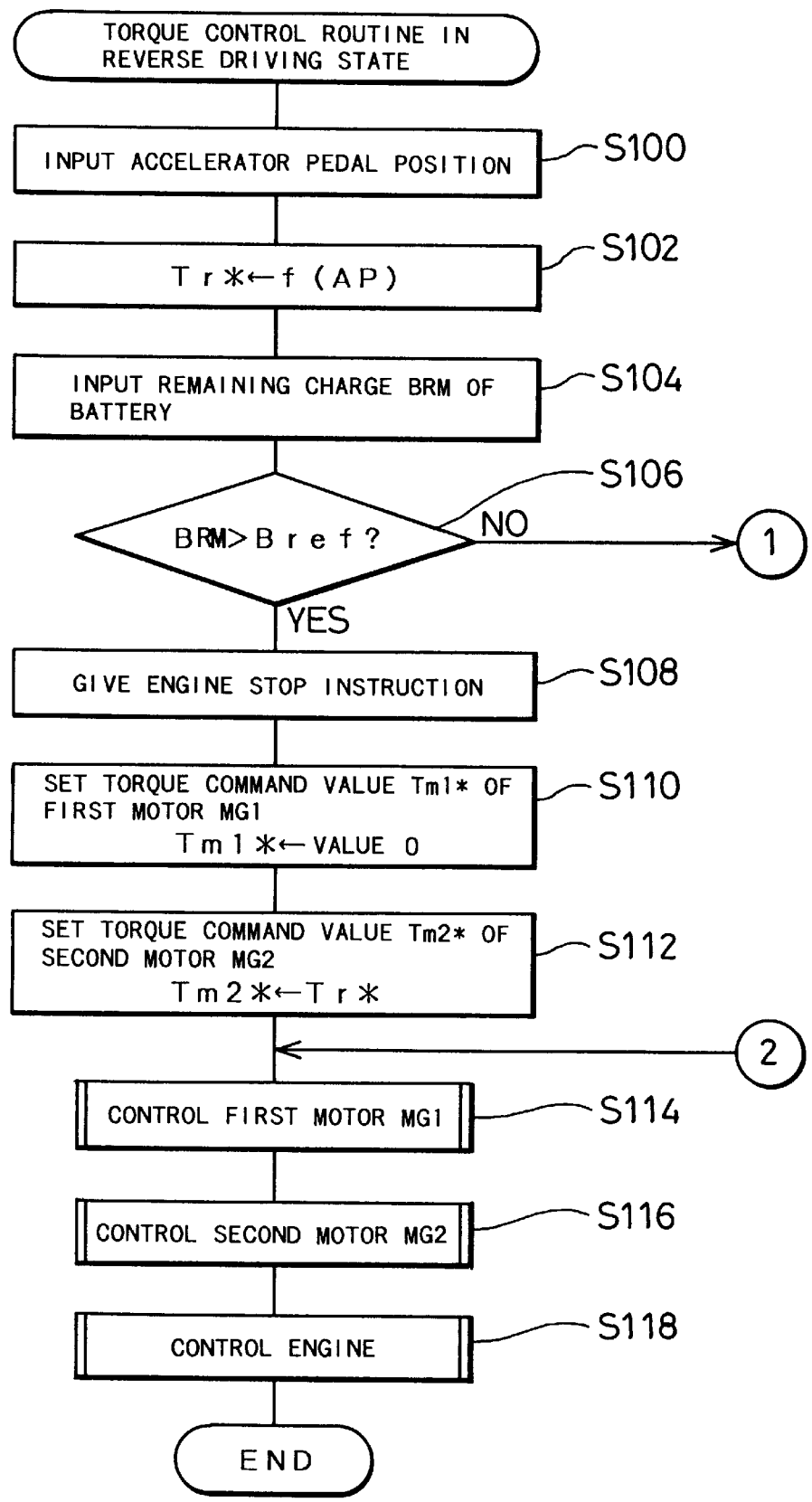
FIGS. 9 and 10 are flowcharts showing a torque control routine in a reverse driving state executed by the controller 180 of the embodiment.
Figure 10:
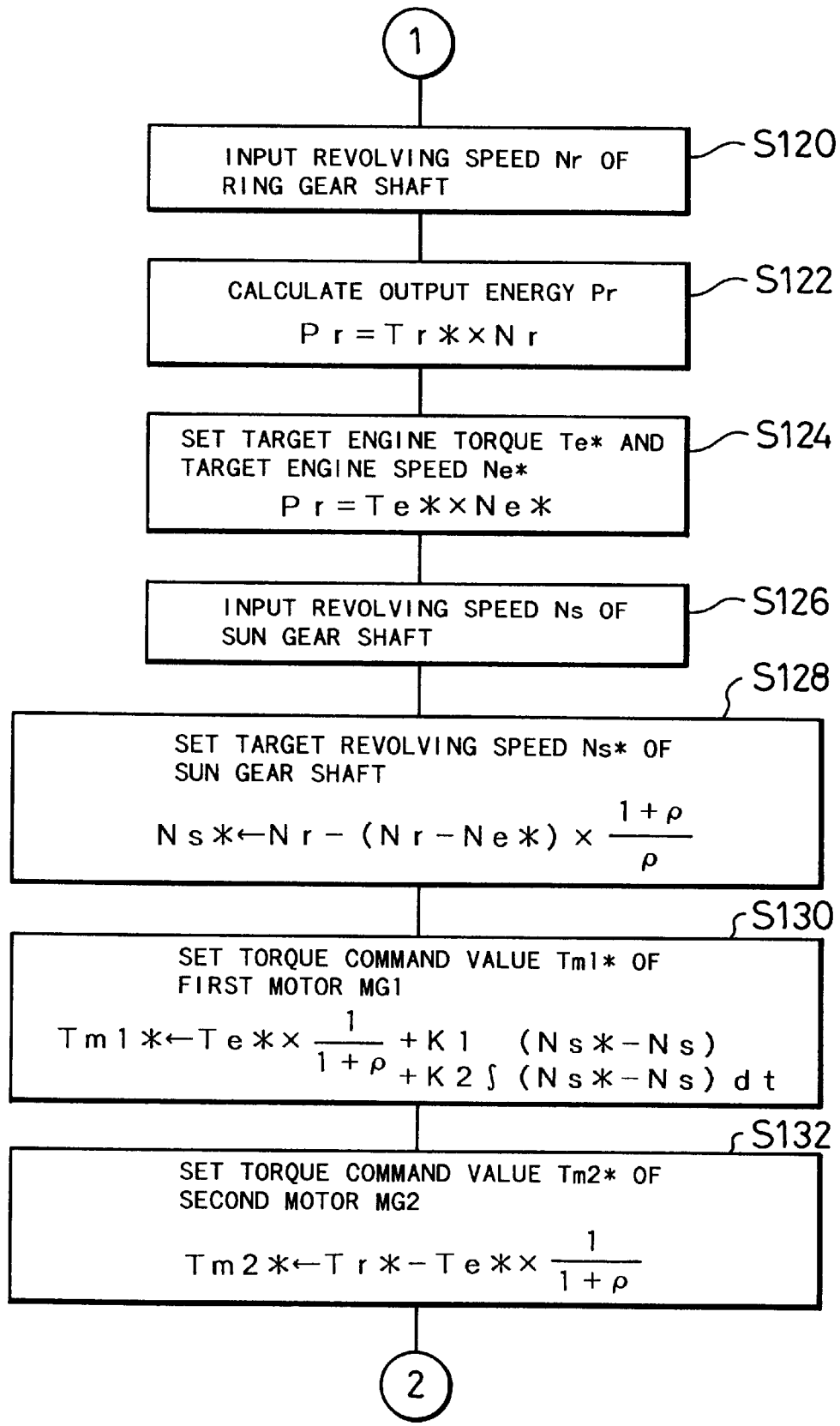

The power output apparatus 110 of the embodiment carries out torque control in a reverse driving state, which follows a torque control routine in a reverse driving state shown in the flowcharts of FIGS. 9 and 10. This routine starts when the gearshift position sensor 184 detects that the driver has set the gearshift 182 in Reverse position and is repeatedly executed at predetermined time intervals (for example, at every 8 msec) while the gearshift 182 is in Reverse position. When the program enters the routine of FIG. 9, the control CPU 190 of the controller 180 first reads the accelerator pedal position AP detected by the accelerator pedal position sensor 164a at step S100. The driver steps on the accelerator pedal 164 when feeling insufficiency of the output torque. The value of the accelerator pedal position AP accordingly represents the desired torque to be output to the ring gear shaft 126 and eventually to the driving wheels 116 and 118.

The control CPU 190 subsequently determines a torque command value Tr*, that is, a target torque to be output to the ring gear shaft 126, based on the input accelerator pedal position AP at step S102. Not the torque to be output to the driving wheels 116 and 118 but the torque to be output to the ring gear shaft 126 is calculated here from the accelerator pedal position AP. This is because the ring gear shaft 126 is mechanically linked with the driving wheels 116 and 118 via the power feed gear 128, the power transmission gear 111, and the differential gear 114 and the determination of the torque to be output to the ring gear shaft 126 thus results in determining the torque to be output to the driving wheels 116 and 118. In this embodiment, a map representing the relationship between the torque command value Tr* and the accelerator pedal position AP is prepared in advance and stored in the ROM 190b. In accordance with a concrete procedure, at step S102, the torque command value Tr* corresponding to the input accelerator pedal position AP is read from the map stored in the ROM 190b. This routine is executed while the gearshift 182 is in Reverse position, and the torque command value Tr* is accordingly negative.

The control CPU 190 then reads the remaining charge BRM of the battery 194 measured by the remaining charge meter 199 at step S104, and compares the input remaining charge BRM with a threshold value Bref at step S106. The threshold value Bref is set as an amount of electric power that enables the second motor MG2 to move the vehicle back for a certain time period with the electrical energy stored in the battery 194, and depends upon the weight and the use of the vehicle.

In case that the remaining charge BRM of the battery 194 is greater than the threshold value Bref at step S106, the program determines that the battery 194 has a sufficient remaining charge BRM and goes to step S108 to output a signal for stopping operation of the engine 150 to the EFIECU 170 through communication. The control CPU 190 sets a torque command value Tm1* of the first motor MG1 equal to zero at step S110 and sets a torque command value Tm2* of the second motor MG2 equal to the torque command value Tr* at step S112, before controlling the first motor MG1, the second motor MG2, and the engine 150 at steps S114 through S118. As a matter of convenience of illustration, the control operations of the first motor MG1, the second motor MG2, and the engine 150 are shown as separate steps. In the actual procedure, however, these control operations are carried out in parallel and comprehensively. By way of example, the control CPU 190 simultaneously controls the first motor MG1 and the second motor MG2 by utilizing an interrupting process, while transmitting an instruction to the EFIECU 170 through communication in order to allow the EFIECU 170 to control the engine 150 concurrently.

Figure 11:
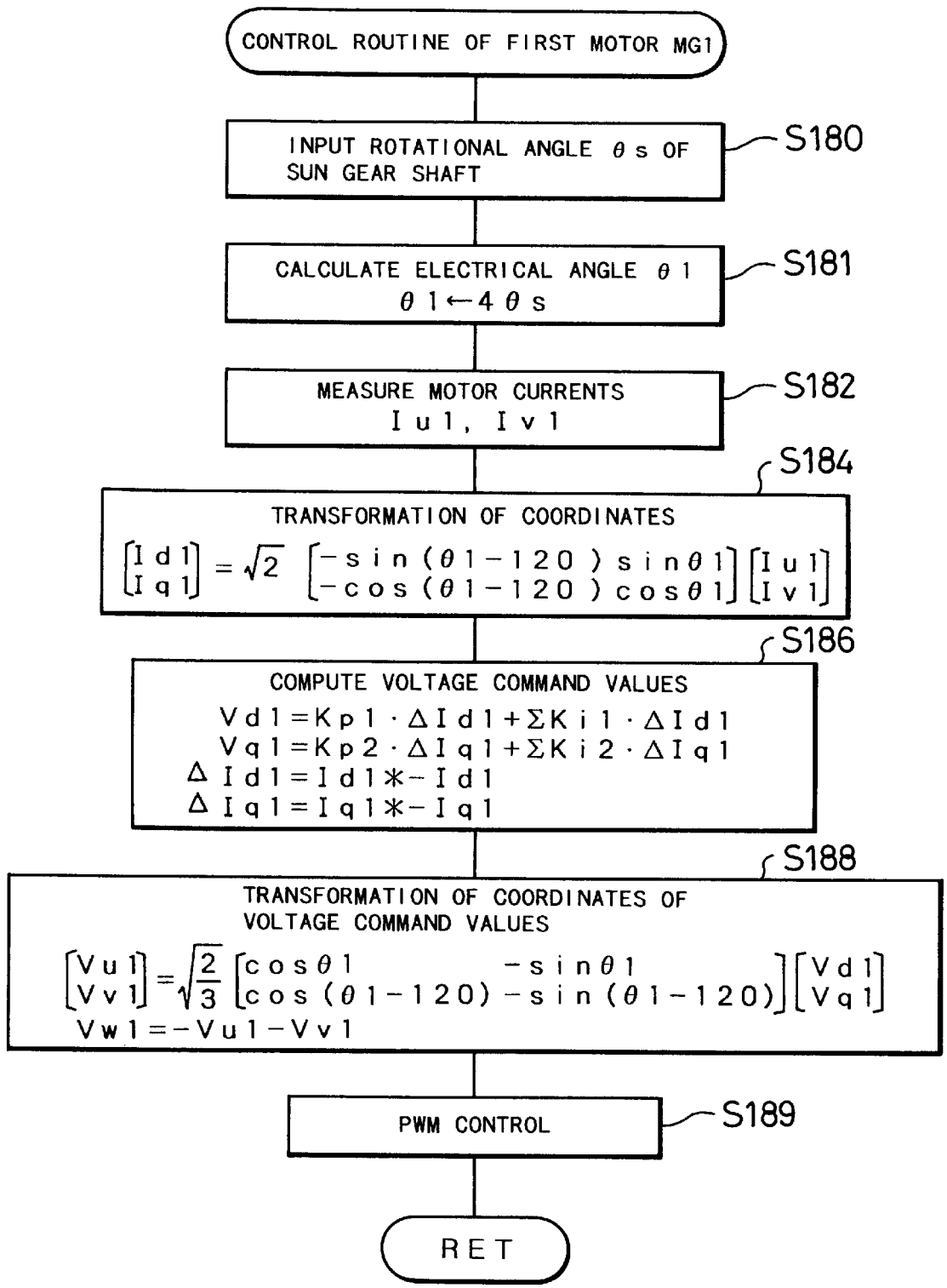
FIG. 11 is a flowchart showing a control routine of the first motor MG1 executed by the controller 180 of the embodiment.

The control operation of the first motor MG1 (step S114 in the flowchart of FIG. 9) follows the control routine of the first motor MG1 shown in the flowchart of FIG. 11. When the program enters the routine of FIG. 11, the control CPU 190 of the controller 180 first receives the rotational angle θs of the sun gear shaft 125 from the revolver 139 at step S180, and calculates an electrical angle θ1 of the first motor MG1 from the rotational angle θs of the sun gear shaft 125 at step S181. In this embodiment, since a synchronous motor of four-pole pair (that is, four N poles and four S poles) is used as the first motor MG1, the rotational angle θs of the sun gear shaft 125 is quadrupled to yield the electrical angle θ1 (θ1=4 θs). The CPU 190 then detects values of currents Iu1 and Iv1 flowing through the U phase and V phase of the three-phase coils 134 in the first motor MG1 with the ammeters 195 and 196 at step S182. Although the currents naturally flow through all the three phases U, V, and W, measurement is required only for the currents passing through the two phases since the sum of the currents is equal to zero. At subsequent step S184, the control CPU 190 executes transformation of coordinates (three-phase to two-phase transformation) using the values of currents flowing through the three phases obtained at step S182. The transformation of coordinates maps the values of currents flowing through the three phases to the values of currents passing through d and q axes of the permanent magnet-type synchronous motor and is executed according to Equation (5) given below. The transformation of coordinates is carried out because the currents flowing through the d and q axes are essential for the torque control in the permanent magnet-type synchronous motor. Alternatively, the torque control may be executed directly with the currents flowing through the three phases.

$$\begin{bmatrix} Id1 \\ Iq1 \end{bmatrix} = \sqrt{2} \begin{bmatrix} -\sin(\theta 1 - 120) & \sin\theta 1 \\ -\cos(\theta 1 - 120) & \cos\theta 1 \end{bmatrix} \begin{bmatrix} Iu1 \\ Iv1 \end{bmatrix} \quad (5)$$

After the transformation to the currents of two axes, the control CPU 190 computes deviations of currents Id1 and Iq1 actually flowing through the d and q axes from current command values Id1* and Iq1* of the respective axes, which are calculated from the torque command value Tm1* of the first motor MG1, and subsequently determines voltage command values Vd1 and Vq1 with respect to the d and q axes at step S186. In accordance with a concrete procedure, the control CPU 190 executes arithmetic operations of Equations (6) and Equations (7) given below. In Equations (7), Kp1, Kp2, Ki1, and Ki2 represent coefficients, which are adjusted to be suited to the characteristics of the motor applied. Each voltage command value Vd1 (Vq1) includes a part in proportion to the deviation ΔI from the current command value I* (the first term on the right side of Equation (7)) and a summation of historical data of the deviations ΔI for 'i' times (the second term on the right side).

$$\Delta Id1 = Id1^* - Id1 \quad (6)$$
$$\Delta Iq1 = Iq1^* - Iq1$$

$$Vd1 = Kp1 \cdot \Delta Id1 + \sum Ki1 \cdot \Delta Id1 \quad (7)$$
$$Vq1 = Kp2 \cdot \Delta Iq1 + \sum Ki2 \cdot \Delta Iq1$$

The control CPU 190 then re-transforms the coordinates of the voltage command values thus obtained (two-phase to three-phase transformation) at step S188. This corresponds to an inverse of the transformation executed at step S184. The inverse transformation determines voltages Vu1, Vv1, and Vw1 actually applied to the three-phase coils 134 as expressed by Equations (8) given below:

$$\begin{bmatrix} Vu1 \\ Vv1 \end{bmatrix} = \sqrt{\frac{2}{3}} \begin{bmatrix} \cos\theta 1 & -\sin\theta 1 \\ \cos(\theta 1 - 120) & -\sin(\theta 1 - 120) \end{bmatrix} \begin{bmatrix} Vd1 \\ Vq1 \end{bmatrix} \quad (8)$$
$$Vw1 = -Vu1 - Vv1$$

The actual voltage control is accomplished by on-off operation of the transistors Tr1 through Tr6 in the first driving circuit 191. At step S189, the on- and off-time of the transistors Tr1 through Tr6 in the first driving circuit 191 is PWM (pulse width modulation) controlled, in order to attain the voltage command values Vu1, Vv1, and Vw1 determined by Equations (8) given above.

It is assumed that the torque command value Tm1* of the first motor MG1 is positive when the torque Tm1 is applied in the direction shown in the nomograms of FIGS. 5 and 6. For an identical positive torque command value Tm1*, the first motor MG1 is controlled to carry out the regenerative operation when the torque command value Tm1* acts in reverse of the rotation of the sun gear shaft 125 as in the state of the nomogram of FIG. 5, and controlled to carry out the power operation when the torque command value Tm1* acts in the direction of rotation of the sun gear shaft 125 as in the state of the nomogram of FIG. 6. For the positive torque command value Tm1*, both the regenerative operation and the power operation of the first motor MG1 implement the identical switching control. In accordance with a concrete procedure, the transistors Tr1 through Tr6 in the first driving circuit 191 are controlled to enable a positive torque to be applied to the sun gear shaft 125 by the combination of the magnetic field generated by the permanent magnets 135 set on the outer surface of the rotor 132 with the revolving magnetic field generated by the currents flowing through the three-phase coils 134. The identical switching control is executed for both the regenerative operation and the power operation of the first motor MG1 as long as the sign of the torque command value Tm1* is not changed. The control routine of the first motor MG1 shown in the flowchart of FIG. 11 is thus applicable to both the regenerative operation and the power operation. When the torque command value Tm1* is negative, the rotational angle θs of the sun gear shaft 125 read at step S180 is varied in a reverse direction. The control routine of the first motor MG1 shown in FIG. 11 is thus also applicable to this case.

Even when the torque command value Tm1* of the first motor MG1 is set equal to zero, the first motor MG1 can be controlled according to the control routine of the first motor MG1 in FIG. 11. In this case, however, the operation of turning off all the transistors Tr1 through Tr6 can exert the same effects.

Figure 12:
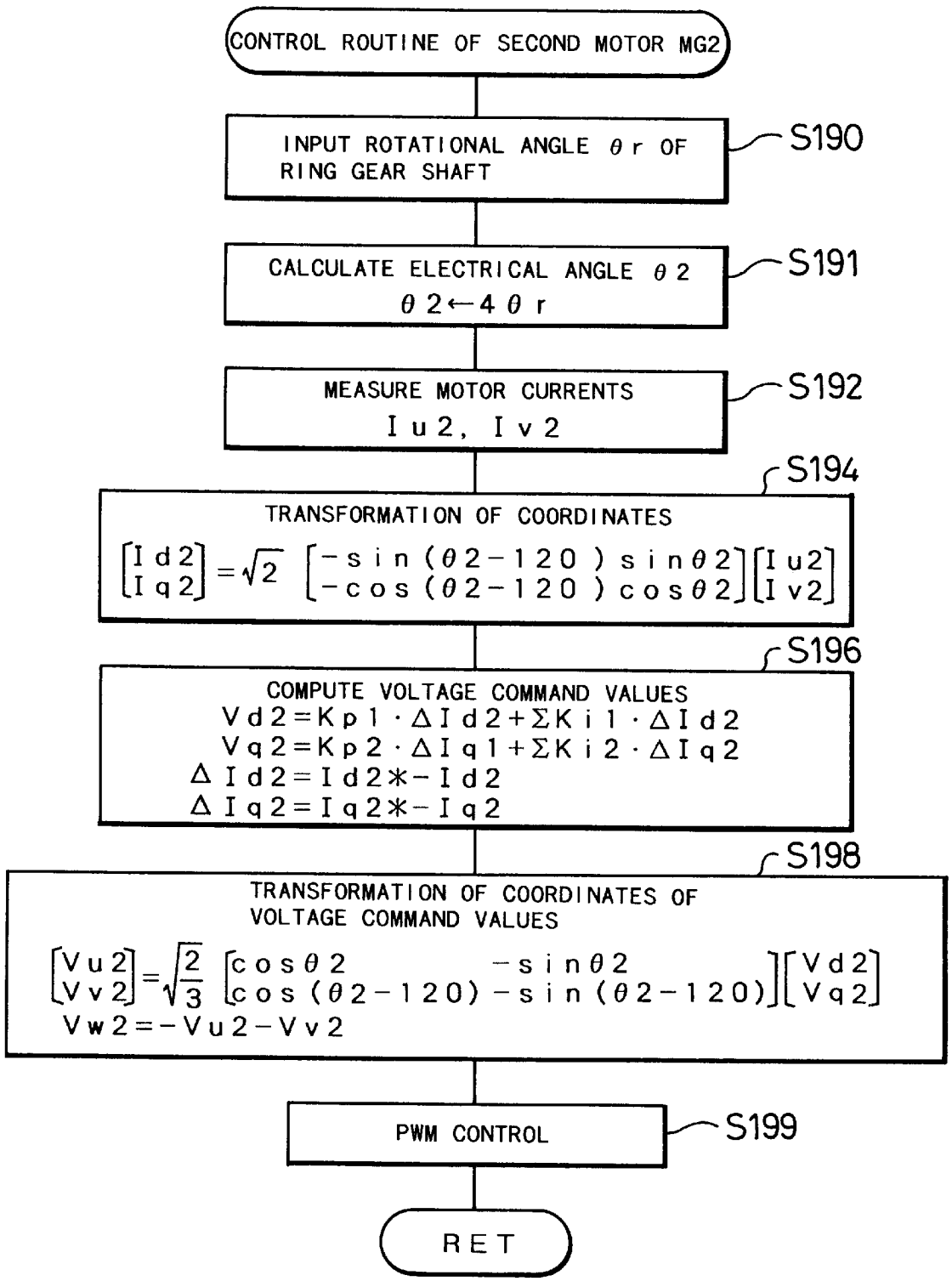
FIG. 12 is a flowchart showing a control routine of the second motor MG2 executed by the controller 180 of the embodiment.

The control operation of the second motor MG2 (step S116 in the flowchart of FIG. 9) follows the control routine of the second motor MG2 shown in the flowchart of FIG. 12. The control procedure of the second motor MG2 is identical with that of the first motor MG1, except that the torque command value Tm2* and the rotational angle θr of the ring gear shaft 126 are used in place of the torque command value Tm1* and the rotational angle θs of the sun gear shaft 125. When the program enters the routine of FIG. 12, the control CPU 190 of the controller 180 first receives the rotational angle θr of the ring gear shaft 126 from the revolver 149 at step S190, and calculates an electrical angle θ2 of the second motor MG2 from the observed rotational angle θr of the ring gear shaft 126 at step S191. At subsequent step S192, phase currents Iu2 and Iv2 of the second motor MG2 are measured with the ammeters 197 and 198. The control CPU 190 then executes transformation of coordinates for the phase currents at step S194, computes voltage command values Vd2 and Vq2 at step S196, and executes inverse transformation of coordinates for the voltage command values at step S198. The control CPU 190 subsequently determines the on- and off-time of the transistors Tr11 through Tr16 in the second driving circuit 192 for the second motor MG2 and carries out the PWM control at step S199. Since the second motor MG2 is a synchronous motor of four-pole pair like the first motor MG1, the rotational angle θr of the ring gear shaft 126 is quadrupled to yield the electrical angle θ2 (θ2=4 θr).

The second motor MG2 is also controlled to carry out either the regenerative operation or the power operation, based on the relationship between the direction of the torque command value Tm2* and the direction of the rotation of the ring gear shaft 126. Like the first motor MG1, the control process of the second motor MG2 shown in the flowchart of FIG. 12 is applicable to both the regenerative operation and the power operation. In this embodiment, it is assumed that the torque command value Tm2* of the second motor MG2 is positive when the torque Tm2 is applied in the direction shown in the nomogram of FIG. 5.

The control operation of the engine 150 (step S118 in the flowchart of FIG. 9) is executed in the following manner. The torque Te and the revolving speed Ne of the engine 150 are regulated to enable the engine 150 to be kept in a stationary driving state at the preset driving point defined by the target engine torque Te* and the target engine speed Ne*. In accordance with a concrete procedure, the control CPU 190 transmits an instruction to the EFIECU 170 through communication, and the EFIECU 70 regulates the amount of fuel injection from the fuel injection valve 151 and the position of the throttle valve 166, thereby enabling the output torque and the revolving speed of the engine 150 to gradually approach to the target engine torque Te* and the target engine speed Ne*. As discussed later at step S130 in the flowchart of FIG. 10, the revolving speed Ne of the engine 150 is controlled by regulating the revolving speed Ns of the sun gear shaft 125 by means of the first motor MG1. The control operation of the engine 150 accordingly includes regulation of the throttle valve 166 and regulation of the air/fuel ratio with respect to the amount of intake air, in order to enable the engine 150 to output the target torque Te*. In response to an engine operation stop instruction output from the control CPU 190, the EFIECU 170 stops fuel injection from the fuel injection valve 151 and application of a voltage to the ignition plug 162 and fully closes the throttle valve 166.

When the remaining charge BRM of the battery 194 is greater than the threshold value Bref at step S106 in the flowchart of FIG. 9, the second motor MG2 outputs the torque Tm2, which has the magnitude of Tr and the direction of moving the vehicle back, to the ring gear shaft 126, while the engine 150 is at a stop and the torque Tm1 of the first motor MG1 is equal to zero. The dynamic collinear line under such conditions is identical with the nomogram of FIG. 7 as discussed previously. The electrical energy consumed by the second motor MG2 is supplied by the electric power discharged from the battery 194.

In case that the remaining charge BRM of the battery 194 is not greater than the threshold value Bref at step S106, on the other hand, the program determines that the battery 194 does not have a sufficient remaining charge BRM and carries out the processing of steps S120 through S132 shown in the flowchart of FIG. 10 to convert the power output from the engine 150 to a power of reversed direction and output the converted power to the ring gear shaft 126. The control CPU 190 of the controller 180 reads the revolving speed Nr of the ring gear shaft 126 at step S120. The revolving speed Nr of the ring gear shaft 126 may be calculated from the rotational angle θr of the ring gear shaft 126 read from the resolver 149. The control CPU 190 then calculates an amount of energy Pr to be output to the ring gear shaft 126 from the torque command value Tr* obtained at step S102 and the input revolving speed Nr of the ring gear shaft 126 (Pr= Tr*×Nr) at step S122, and sets the target torque Te* and the target revolving speed Ne* of the engine 150 based on the calculated amount of energy Pr at step S124. Since the energy Pe output from the engine 150 is defined as the product of the torque Te and the revolving speed Ne, the energy Pr to be output to the ring gear shaft 126 and the target torque Te* and the target revolving speed Ne* of the engine 150 satisfy the relationship of Pr=Pe=Te*×Ne*. There are, however, numerous combinations of the target torque Te* and the target revolving speed Ne* of the engine 150 satisfying the above relationship. In this embodiment, favorable combinations of the target engine torque Te* and the target engine speed Ne* are experimentally or otherwise determined in advance for the respective amounts of energy Pr and stored as a map in the ROM 190b. The favorable combinations represent the driving points that enable the engine 150 to be driven at the highest possible efficiency. In accordance with a concrete procedure, at step S124, the combination of the target engine torque Te* and the target engine speed Ne* corresponding to the calculated amount of energy Pr is read from the map stored in the ROM 190b.

The control CPU 190 subsequently reads the revolving speed Ns of the sun gear shaft 125 at step S126. The revolving speed Ns is obtained from the rotational angle θs of the sun gear shaft 125 measured with the resolver 139. A target revolving speed Ns* of the sun gear shaft 125 is then calculated from the target revolving speed Ne* of the engine 150 and the revolving speed Nr of the ring gear shaft 126 according to Equation (9) given below at step S128. Equation (9) is equivalent to Equation (2) discussed above.

$$Ns^* \leftarrow Nr - (Nr - Ne^*) \times \frac{1+\rho}{\rho} \qquad (9)$$

The control CPU 190 sets a calculated value according to the following Equation (10) to the torque command value Tm1* of the first motor MG1 at subsequent step S130. The first term on the right side of Equation (10) is obtained from the equilibrium on the dynamic collinear line shown in the nomogram of FIG. 8. The second term on the right side is a proportional term to cancel the deviation of the actual revolving speed Ns from the target revolving speed Ns*, and the third term on the right side is an integral term to cancel the stationary deviation. In the stationary state (that is, when the deviation of the revolving speed Ns from the target revolving speed Ns* is equal to zero), the torque command value Tm1* of the first motor MG1 is set equal to the first term on the right side Te*/(1+ρ) obtained from the equilibrium on the dynamic collinear line. K1 and K2 in Equation (10) denote proportional constants.

$$Tm1^* \leftarrow Te^* \times \frac{1}{1+\rho} + K1(Ns^* - Ns) + K2 \int (Ns^* - Ns) dt \qquad (10)$$

The control CPU 190 then sets a calculated value according to the following Equation (11) to the torque command value Tm2* of the second motor MG2 at step S132. Equation (11) is determined to output the torque defined by the torque command value Tr* to the ring gear shaft 126 when the dynamic collinear line is kept stationary in the state of FIG. 8. Since the target torque Te* of the engine 150 is positive and the torque command value Tr* is negative, the torque command value Tm2* of the second motor MG2 set by Equation (11) is given as the negative sum of the absolute value of the torque command value Tr* and the absolute value of the target engine torque Te*. Namely the torque command value Tm2* has a greater magnitude than but the opposite direction to the divisional torque Ter output to the ring gear shaft 126 based on the output torque Te from the engine 150.

$$Tm2^* \leftarrow Tr^* - Te \times \frac{1}{1+\rho} \qquad (11)$$

When the dynamic collinear line is kept stationary in the state of the nomogram of FIG. 8, the torque command values Tm1* and Tm2* of the motors MG1 and MG2 set by Equations (10) and (11) enable the electrical energy Pm1 regenerated by the first moor MG1 to be used as the electrical energy Pm2 consumed by the second motor MG2. The energy Pe output from the engine 150 is accordingly subjected to the torque conversion and output to the ring gear shaft 126.

After setting the target torque Te* and the target revolving speed Ne* of the engine 150 and the torque command values Tm1* and Tm2* of the motors MG1 and MG2, the program controls the engine 150, the first motor MG1, and the second motor MG2 based on these preset values at steps S114 through S118 in the flowchart of FIG. 9.

As discussed above, the power output apparatus 110 of the embodiment converts the energy Pe output from the engine 150 to a torque and outputs the torque to the ring gear shaft 126 and eventually to the driving wheels 116 and 118. This structure moves the vehicle back without using the electric power discharged from the battery 194. The power output apparatus 110 of the embodiment can select either one of the operations based on the remaining charge BRM of the battery 194; one operation converts the electrical energy stored in the battery 194 to a mechanical energy by means of the second motor MG2 and outputs the mechanical energy to the ring gear shaft 126, and the other operation converts a mechanical energy output from the engine 150 to a torque and outputs the torque to the ring gear shaft 126. This structure effectively protects the battery 194 from being excessively discharged.

Figure 13:
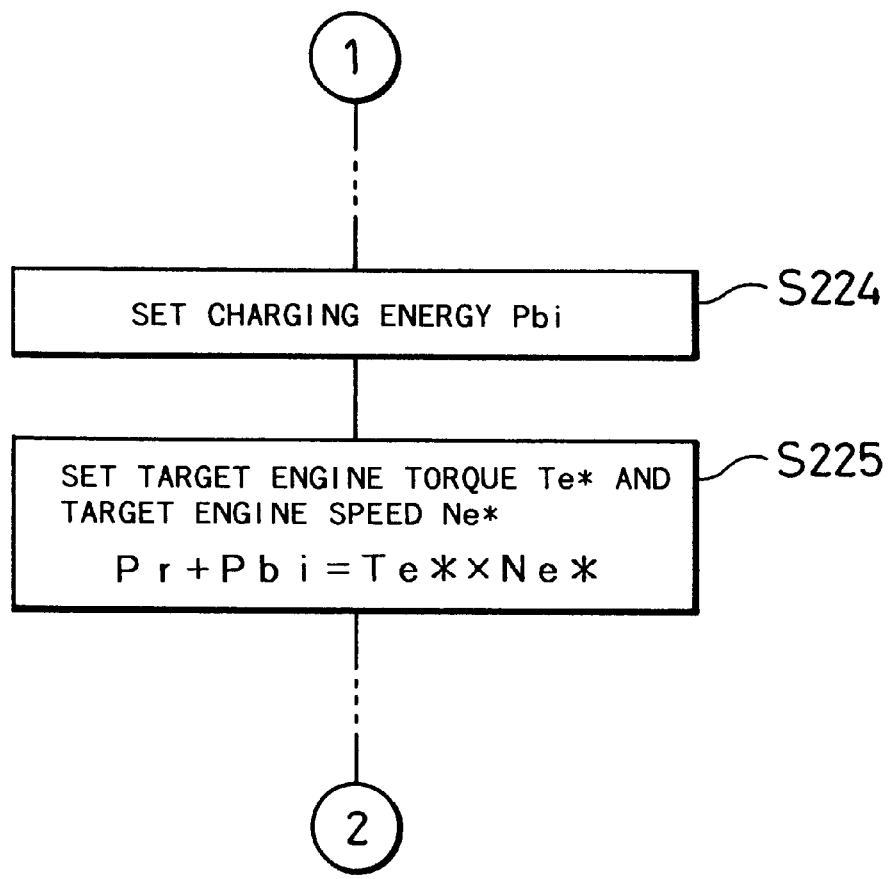
FIG. 13 is a flowchart showing a part of a modified torque control routine in a reverse driving state.

In the power output apparatus 110 of the embodiment, when the remaining charge BRM of the battery 194 is not greater than the threshold value Bref, the engine 150 is driven upon condition that the energy Pe output from the engine 150 is made identical with the energy Pr to be output to the ring gear shaft 126. Namely the energy Pe output from the engine 150 is subjected to the torque conversion and output to the ring gear shaft 126. Another possible structure drives the engine 150 upon condition that the energy Pe output from the engine 150 is made greater than the energy Pr to the output to the ring gear shaft 126, and charges the battery 194 with part of the electric power regenerated by the first motor MG1. In this case, for example, the processing of step S124 in the torque control routine in the reverse driving state shown in the flowcharts of FIGS. 9 and 10, that is, the process of setting the target torque Te* and the target revolving speed Ne* of the engine 150, may be replaced by the processing of steps S224 and S225 shown in the flowchart of FIG. 13. The control CPU 190 sets a charging energy Pbi, with which the battery 194 is charged, based on the remaining charge BRM of the battery 194 at step S224. The control CPU 190 then specifies the energy Pe to be output from the engine 150 as the sum of the energy Pr to be output to the ring gear shaft 126 and the preset charging energy Pbi and sets the target engine torque Te* and the target engine speed Ne* based on this specified energy Pe at step S225. This process yields a difference between the electrical energy Pm1 regenerated by the first motor MG1 and the electrical energy Pm2 consumed by the second motor MG2. The battery 194 can thus be charged with the surplus electrical energy. The procedure of setting the target torque Te* and the target revolving speed Ne* of the engine 150 by taking into account the charging energy Pbi enables the battery 194 to be charged while moving the vehicle back. When the remaining charge BRM of the battery 194, which has been charged with the charging energy Pbi, becomes greater than the threshold value Bref, the program determines that the battery 194 does not require any further charging at step S106 in the flowchart of FIG. 9 and carries out the processing of steps S108 through S118. This structure allows the remaining charge BRM of the battery 194 to be not less than the threshold value Bref.

The power output apparatus 110 of the embodiment stops the operation of the engine 150 when the remaining charge BRM of the battery 194 is greater than the threshold value Bref. Another possible structure may, however, set a predetermined revolving speed, for example, an idle revolving speed, to the target revolving speed Ne* of the engine 150 and allow the engine 150 to be driven at the predetermined revolving speed. In such a structure, the first motor MG1 can be raced by setting the torque command value Tm1* of the first motor MG1 equal to zero. Compared with the structure that stops the operation of the engine 150, this alternative structure enables the driving point of the engine 150 to be more readily changed.

Figure 14:
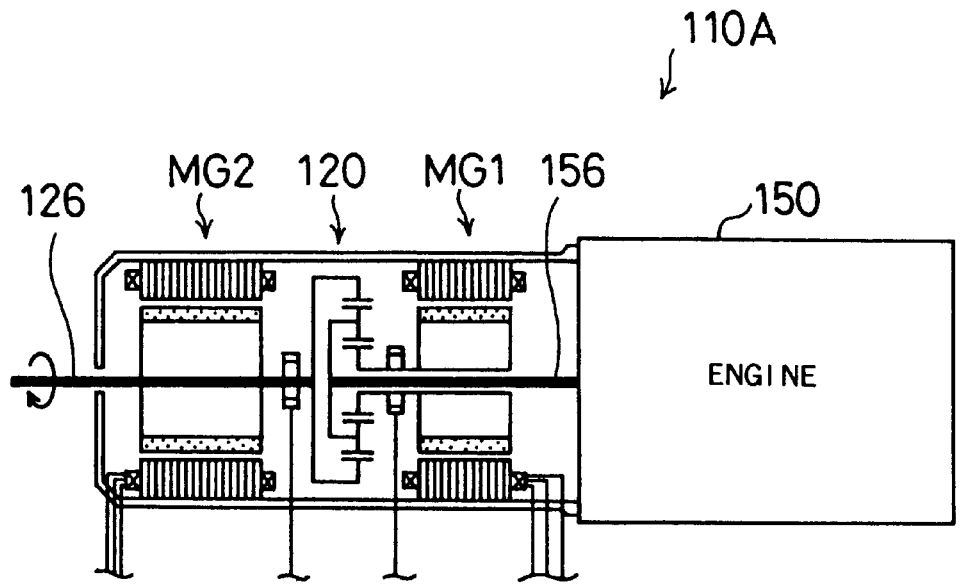
FIG. 14 schematically illustrates another power output apparatus 110A as a modified example.
Figure 15:
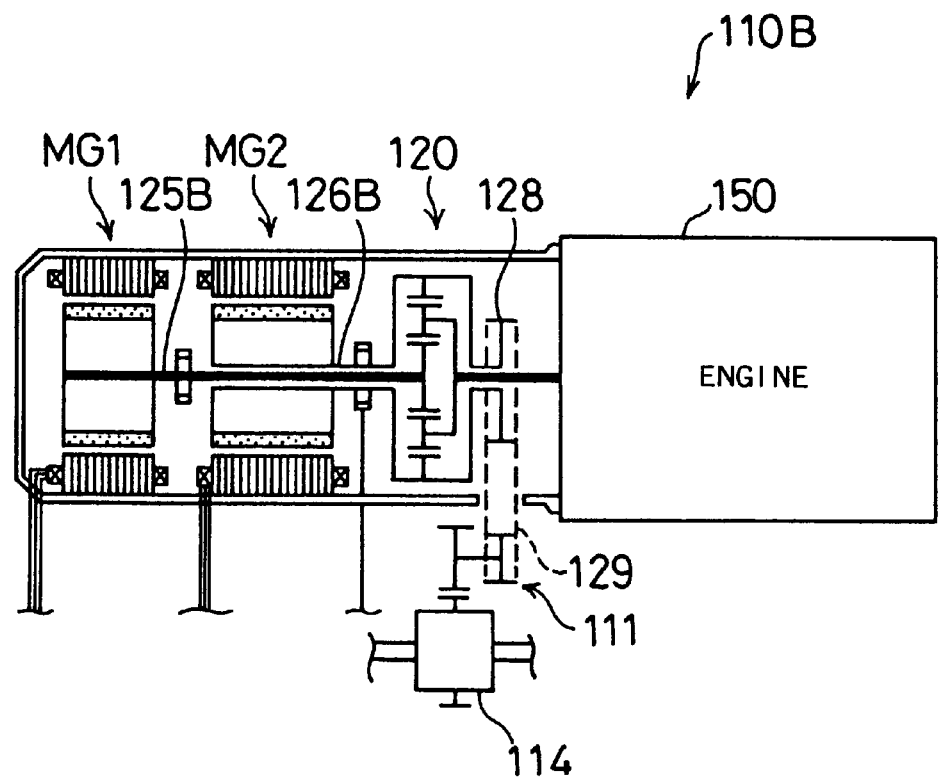
FIG. 15 schematically illustrates still another power output apparatus 110B as another modified example.

In the power output apparatus 110 of the embodiment, the power output to the ring gear shaft 126 is taken out of the arrangement between the first motor MG1 and the second motor MG2 via the power feed gear 128 linked with the ring gear 122. Like another power output apparatus 110A shown in FIG. 14 as a modified example, however, the power may be taken out of the casing 119, from which the ring gear shaft 126 is extended. FIG. 15 shows still another power output apparatus 110B as another modified example, wherein the engine 150, the planetary gear 120, the second motor MG2, and the first motor MG1 are arranged in this sequence. In this case, a sun gear shaft 125B may not have a hollow structure, whereas a hollow ring gear shaft 126B is required. This modified structure enables the power output to the ring gear shaft 126B to be taken out of the arrangement between the engine 150 and the second motor MG2.

Figure 16:
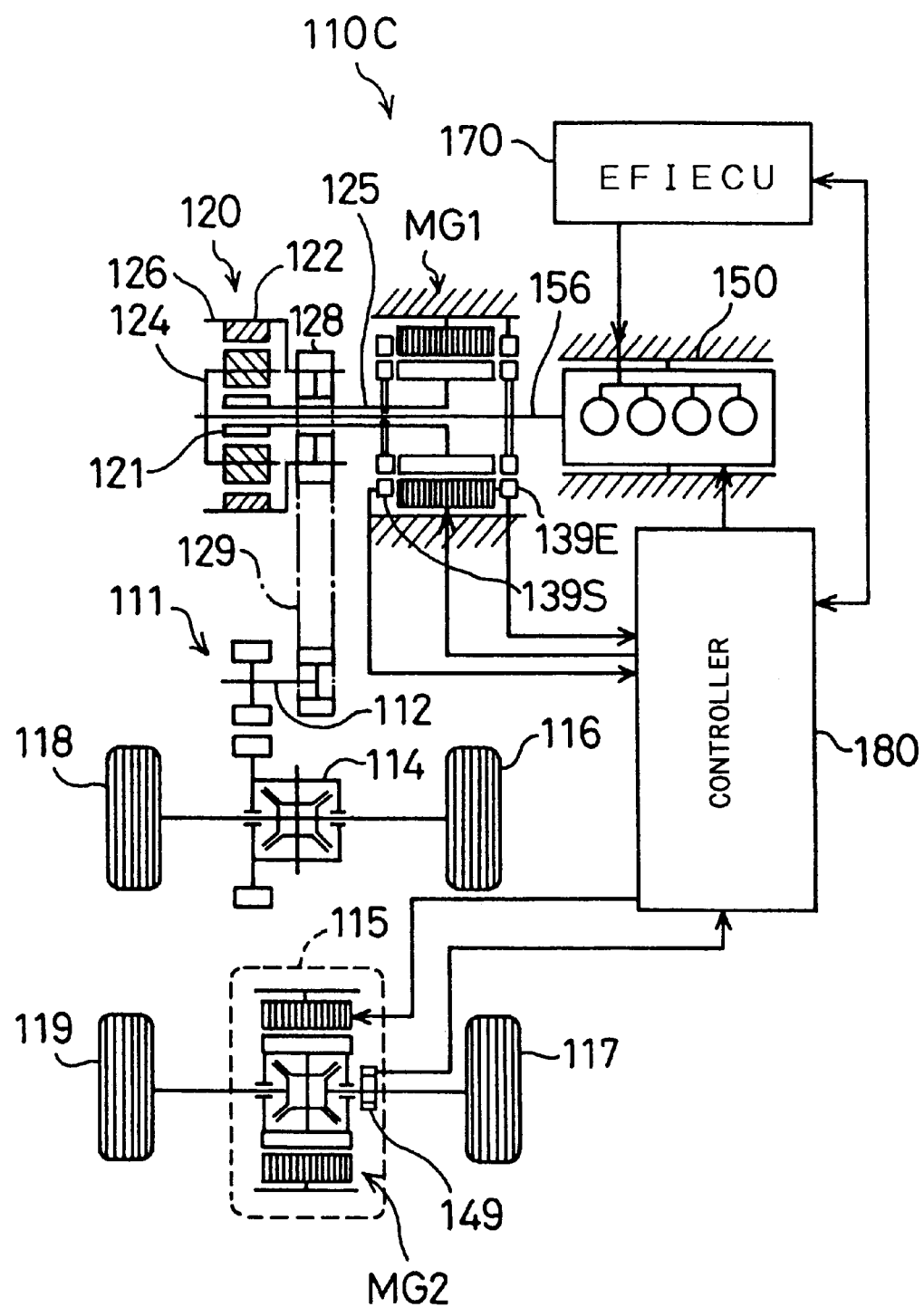
FIG. 16 schematically illustrates structure of a four-wheel-drive vehicle with a power output apparatus 110C incorporated therein.

The power output apparatus 110 of the embodiment and their modified examples discussed above are applied to the FR-type or FF-type two-wheel-drive vehicle. In another modified example of FIG. 16, however, a power output apparatus 110C is applied to a four-wheel-drive vehicle. In this structure, the second motor MG2 is separated from the ring gear shaft 126 and independently arranged in the rear-wheel portion of the vehicle, so as to drive the rear driving wheels 117 and 119. The ring gear shaft 126 is, on the other hand, connected to the differential gear 114 via the power feed gear 128 and the power transmission gear 111, in order to drive the front driving wheels 116 and 118. The torque control routine in the reverse driving state discussed above is also applicable to this structure.

Figure 17:
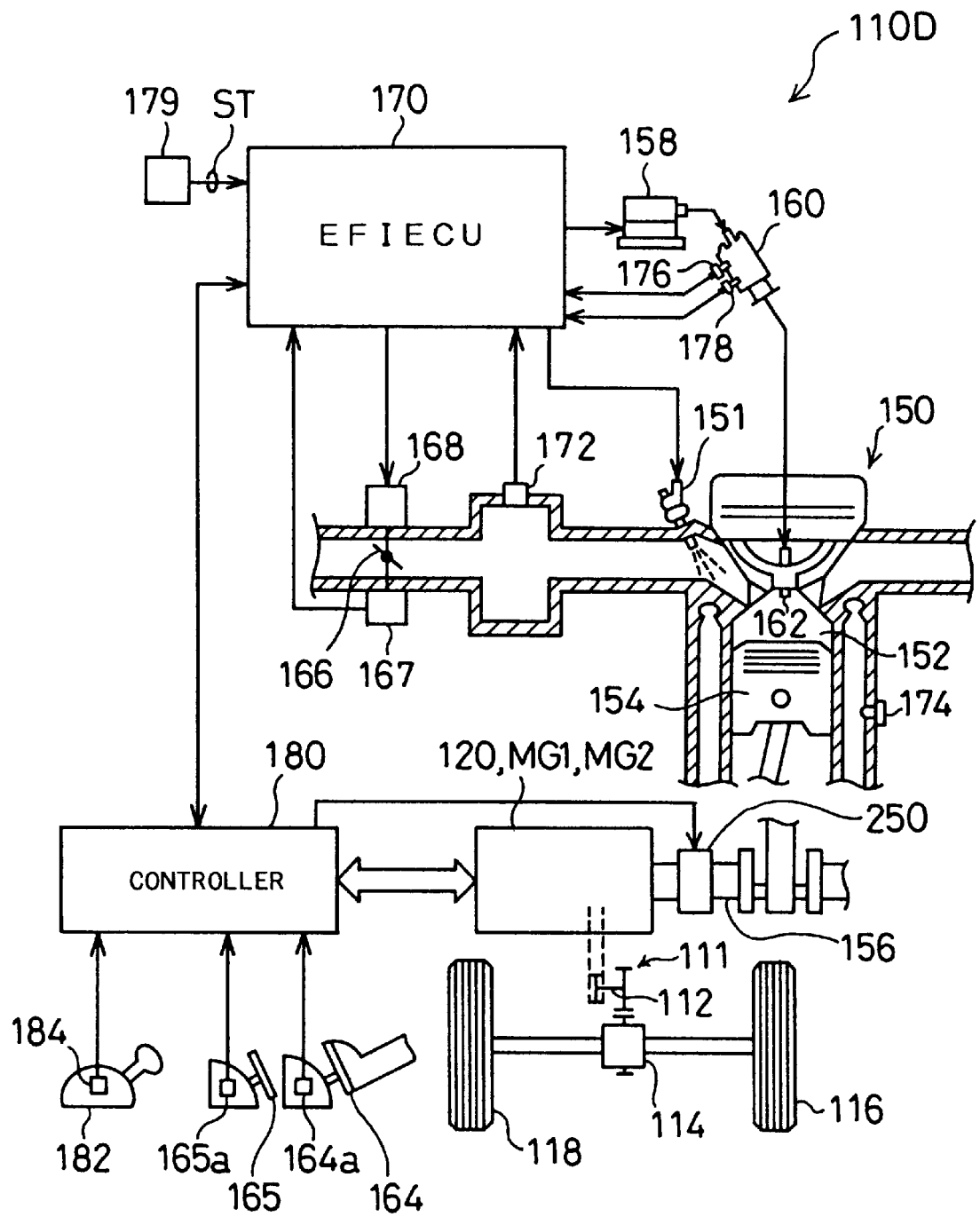
FIG. 17 schematically illustrates structure of a vehicle with a power output apparatus 110D incorporated therein as a second embodiment according to the present invention.

The following describes another power output apparatus 110D as a second embodiment according to the present invention. FIG. 17 schematically illustrates structure of a vehicle with the power output apparatus 110D of the second embodiment incorporated therein. Referring to FIG. 17, the power output apparatus 110D of the second embodiment has a similar structure to that of the power output apparatus 110 of the first embodiment, except that a forward-reverse switching gear unit 250 is attached to the crankshaft 156 of the engine 150. The same constituents in the power output apparatus 110D of the second embodiment as those in the power output apparatus 110 of the first embodiment are shown by like numerals and symbols and not specifically described here. The symbols used in the description of the first embodiment have the same meanings in the description of the second embodiment, unless otherwise specified.

Figure 18:
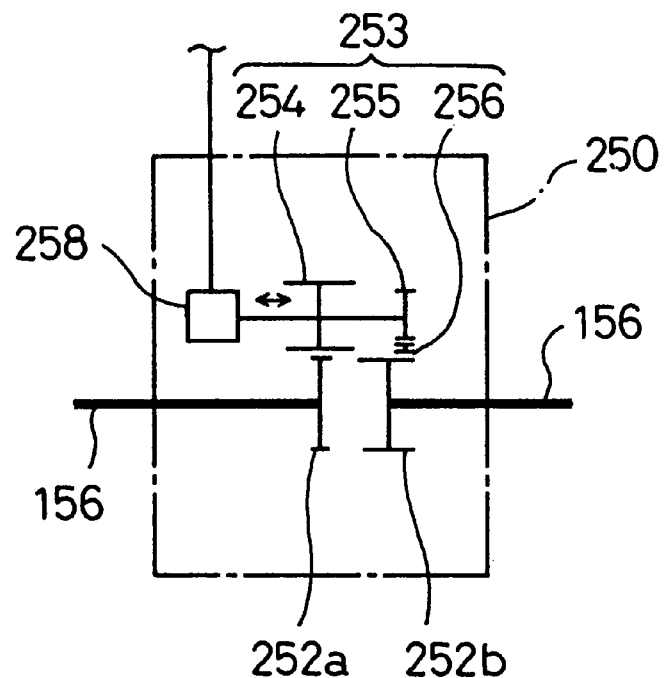
FIG. 18 schematically illustrates structure of a forward-reverse switching gear unit 250.

FIG. 18 schematically illustrates structure of the forward-reverse switching gear unit 250. In the power output apparatus 110D of the second embodiment, the forward-reverse switching gear unit 250 includes output shaft power gears 252a and 252b respectively attached to the crankshaft 156 on the side of the engine 150 and on the side of the planetary gear 120, a forward-reverse switching gear 253 consisting of a normal direction gear 254 and an inverted direction gear 255, a reverse rotation gear 256 engaging with the output shaft power gear 252b, and an actuator 258 for driving the forward-reverse switching gear 253 in the axial direction. The normal direction gear 254 of the forward-reverse switching gear 253 engages with the output shaft power gear 252a and has teeth formed in the axial direction to allow engagement with and release from the power output gear 252b. When the forward-reverse switching gear 253 is shifted to a forward position (rightward in the drawing of FIG. 18) by the actuator 258, the normal direction gear 254 engages with the output shaft power gear 252b. When the forward-reverse switching gear 253 is shifted to a reverse position (the position in the drawing of FIG. 18), on the other hand, the normal direction gear 254 is released from the engagement with the output shaft power gear 252b. The inverted direction gear 255 of the forward-reverse switching gear 253 has a little smaller diameter than that of the normal direction gear 254. When the forward-reverse switching gear 253 is shifted to the reverse position by the actuator 258, the inverted direction gear 255 engages with the reverse rotation gear 256. When the forward-reverse switching gear 253 is shifted to the forward position, on the other hand, the inverted direction gear 255 is released from the engagement with the reverse rotation gear 256.

Figure 19:
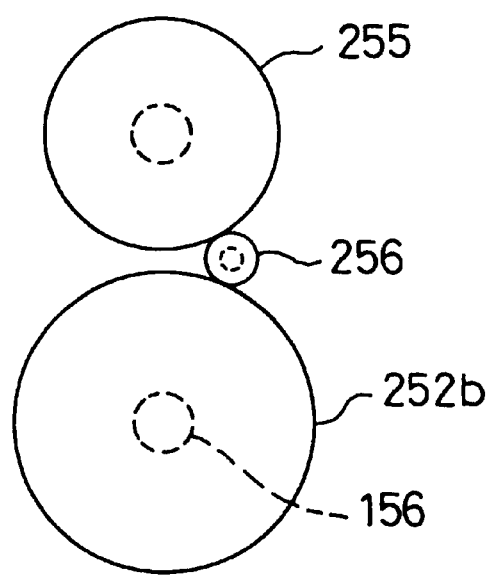
FIG. 19 shows engagement of an inverted direction gear 255, a reverse rotation gear 256, and an output shaft power gear 252b when a forward-reverse switching gear 253 is shifted to a reverse position.

FIG. 19 shows engagement of the inverted direction gear 255, the reverse rotation gear 256, and the output shaft power gear 252b when the forward-reverse switching gear 253 is shifted to the reverse position. The reverse rotation gear 256 is installed to locate its rotating axis deviated from the line that connects the rotating axis of the inverted direction gear 255 with the crankshaft 156, in order to increase the diameter of the inverted direction gear 255 as large as possible to be substantially identical with the diameter of the normal direction gear 254. One end of the rotating axis of the forward-reverse switching gear 253 is inserted into the actuator 258, and the position of the forward-reverse switching gear 253 along the rotating axis is changed by the actuator 258. The actuator 258 is connected to the controller 180 via a conductive line, and is driven and controlled by the controller 180.

Figure 20:
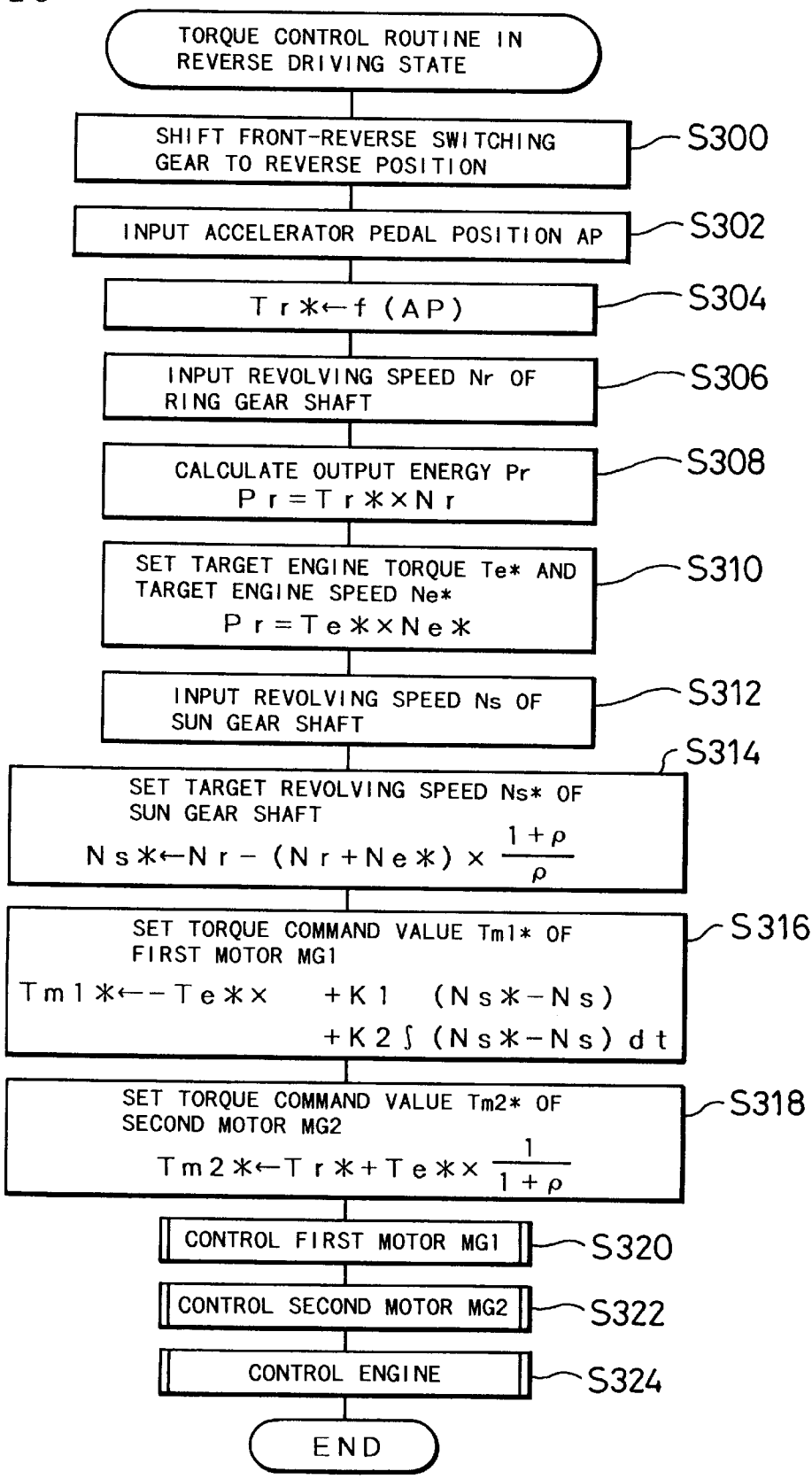
FIG. 20 is a flowchart showing a torque control routine in a reverse driving state executed by the controller 180 of the second embodiment.

The power output apparatus 110D of the second embodiment thus constructed carries out torque control in a reverse driving state, which follows a torque control routine in a reverse driving state shown in the flowchart of FIG. 20. This routine is executed when the gearshift position sensor 184 detects that the driver has set the gearshift 182 in Reverse position. When the program enters the routine of FIG. 20, the control CPU 190 of the controller 180 first sets the forward-reverse switching gear unit 250 in Reverse position at step S300. In accordance with a concrete procedure, the control CPU 190 outputs a driving signal to the actuator 258 of the forward-reverse switching gear unit 250 and drives the actuator 258 to shift the forward-reverse switching gear 253 to the reverse position. In the power output apparatus 110D of the second embodiment, while the vehicle moves forward or is at a stop, the normal direction gear 254 of the forward-reverse switching gear 253 engages with both the output shaft power gear 252a and the output shaft power gear 252b.

The control CPU 190 then reads the accelerator pedal position AP from the accelerator pedal position sensor 164a at step S302 and determines the torque command value Tr* to be output to the ring gear shaft 126 based on the input accelerator pedal position AP at step S304. The program then carries out the processing of steps S306 through S324, which are identical with the processing of steps S120 through S132 and that of steps S114 through S118 in the torque control routine in the reverse driving state shown in the flowcharts of FIGS. 9 and 10. Since the forward-reverse switching gear unit 250 is set in Reverse position, the power input to the planetary carrier 124 of the planetary gear 120 is in reverse of the power output from the engine 150. At steps S314, S316, and S318, the target torque Te* and the target revolving speed Ne* of the engine 150 are thereby multiplied by minus 1. In the second embodiment, for the convenience of illustration, the control operations of the first motor MG1, the second motor MG2, and the engine 150 are shown as separate steps. In the actual procedure, however, these control operations are carried out in parallel and comprehensively.

Figure 21:
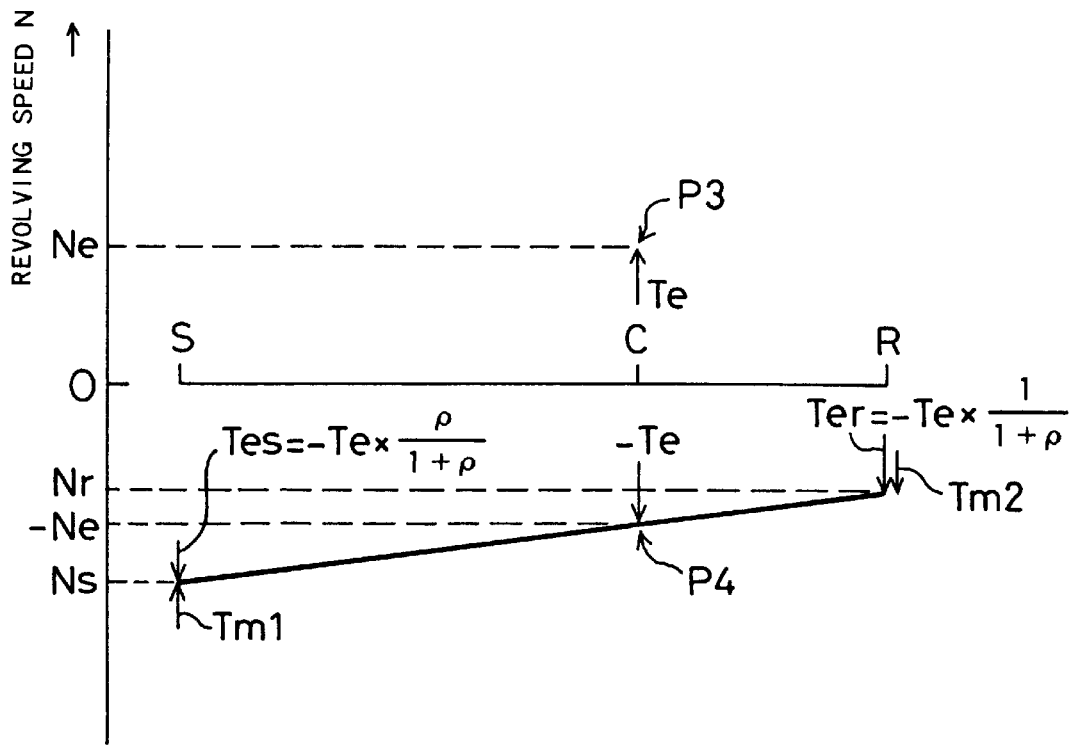
FIG. 21 is a nomogram showing the state of a dynamic collinear line in the reverse driving state in the second embodiment.

FIG. 21 is a nomogram showing the state of a dynamic collinear line when the forward-reverse switching gear unit 250 is set in Reverse position. It is here assumed that the engine 150 is driven at a driving point P3 defined by the torque Te and the revolving speed Ne. The forward-reverse switching gear unit 250 attached to the crankshaft 156 reverses the direction of the rotation and the torque, so that the revolving speed Ne and the torque Te of the engine 150 are plotted on a driving point P4, which appears as a mirror image of the driving point P3 across the abscissa in the nomogram of FIG. 21. Since the revolving speed Nr of the ring gear shaft 126 is also negative, the nomogram of FIG. 21 is an upside-down equivalent to the nomogram of FIG. 5 and analyzed in a similar manner.

The power output apparatus 110D of the second embodiment has the forward-reverse switching gear unit 250, which enables output of the same torque when the vehicle moves forward and moves back.

In the power output apparatus 110D of the second embodiment, the engine 150 is driven upon condition that the energy Pe output from the engine 150 is identical with the energy Pr to be output to the ring gear shaft 126. The energy Pe output from the engine 150 is thus subjected to the torque conversion and output to the ring gear shaft 126. In accordance with another possible application, the energy Pe output from the engine 150 may be made greater than or less than the energy Pr to be output to the ring gear shaft 126, based on the remaining charge BRM of the battery 194. In this case, the engine 150 is driven while the battery 194 is charged with part of the electric power regenerated by the first motor MG1 or the battery 194 is discharged to supplement part of the electric power consumed by the second motor MG2.

Figure 22:
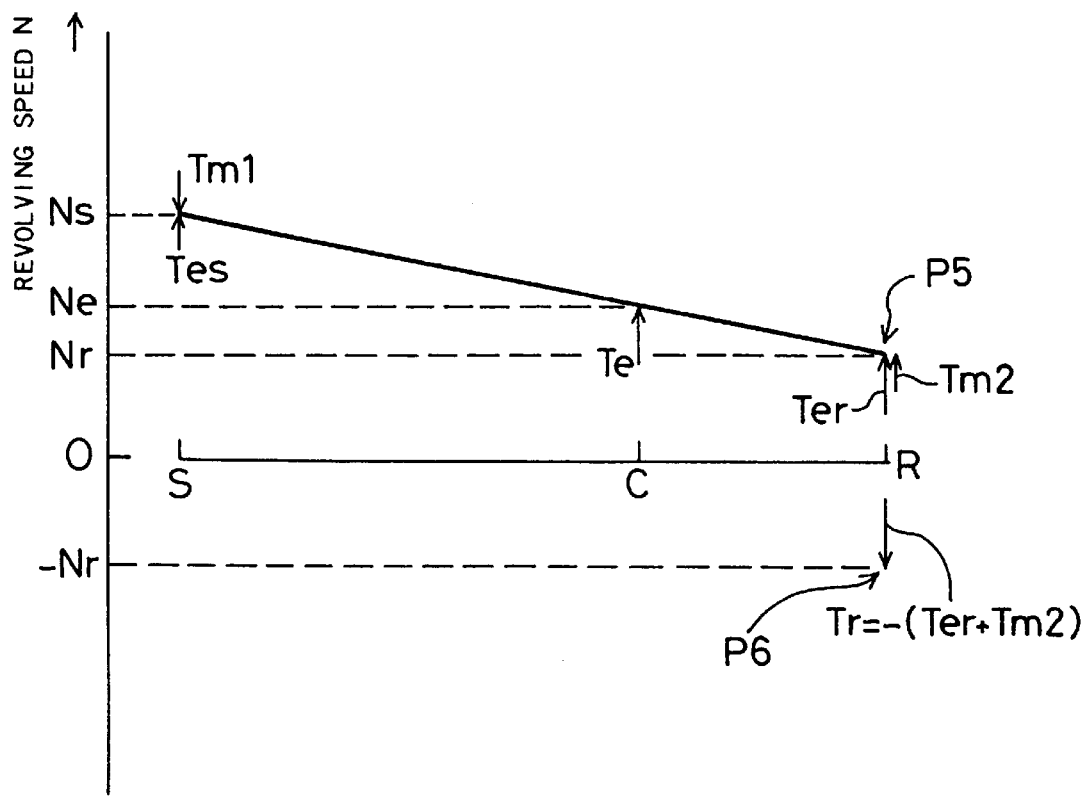
FIG. 22 is a nomogram showing the state of a dynamic collinear line in the reverse driving state in a modified example of the second embodiment.

In the power output apparatus 110D of the second embodiment, the forward-reverse switching gear unit 250 is attached to the crankshaft 156. The forward-reverse switching gear unit 250 may, however, be attached to the drive shaft 112 after the ring gear shaft 126. By way of example, the forward-reverse switching gear unit 250 is attached to the ring gear shaft 126 on the left side (in the drawing) of the second motor MG2 in the power output apparatus 110A of modified example shown in FIG. 14. FIG. 22 is a nomogram in this structure. The nomogram of FIG. 22 is identical with the nomogram of FIG. 5, wherein the vehicle moves forward. The direction of the rotation and the torque of the ring gear shaft 126 disposed after the forward-reverse switching gear unit 250 is reversed by the forward-reverse switching gear unit 250. The ring gear shaft 126 is accordingly driven at a driving point P6, which is a mirror image of the driving point P5 of the ring gear 122, thereby moving the vehicle back.

The present invention is not restricted to the above embodiments or its modified examples, but there may be many modifications, changes, and alterations without departing from the scope or spirit of the main characteristics of the present invention.

For example, although the gasoline engine is used as the engine 150 in the above embodiments, the principle of the invention is also applicable to other internal combustion engines and external combustion engines, such as Diesel engines, turbine engines, and jet engines.

In the above embodiments, the planetary gear 120 is used as the three shaft-type power input/output means. Another available example is a double-pinion planetary gear having plural sets of planetary pinion gears. One planetary pinion gear in each pair is linked with the sun gear while the other is linked with the ring gear, and the pair of planetary pinion gears are linked with each other to revolve around the sun gear while rotating on its axis. Any other device or gear unit, such as a differential gear, is also applicable for the three shaft-type power input/output means, as long as it can determine powers input to and output from the residual one shaft based on predetermined powers input to and output from any two shafts among the three shafts.

Permanent magnet (PM)-type synchronous motors are used as the first motor MG1 and the second motor MG2 in the embodiments discussed above. Any other motors which can implement both the regenerative operation and the power operation, such as variable reluctance (VR)-type synchronous motors, vernier motors, d.c. motors, induction motors, superconducting motors, and stepping motors, may, however, be used according to the requirements.

Transistor inverters are used as the first and the second driving circuits 191 and 192 in the above embodiments. Other available examples include IGBT (insulated gate bipolar mode transistor) inverters, thyristor inverters, voltage PWM (pulse width modulation) inverters, square-wave inverters (voltage inverters and current inverters), and resonance inverters.

The battery 194 in the above embodiments may include Pb cells, NiMH cells, Li cells, or the like cells. A capacitor may be used in place of the battery 194.

Although the power output apparatus is mounted on the vehicle in all the above embodiments, it may be mounted on other transportation means like ships and airplanes as well as a variety of industrial machines.

It should be clearly understood that the above embodiments are only illustrative and not restrictive in any sense. The scope and spirit of the present invention are limited only by the terms of the appended claims.

What is claimed is:

1. A power output apparatus for outputting power to a drive shaft, said power output apparatus comprising:
    an engine having an output shaft;
    a first motor having a rotating shaft and inputting and outputting power to and from said rotating shaft;
    a second motor inputting and outputting power to and from said drive shaft;
    three shaft-type power input/output means having three shafts respectively linked with said drive shaft, said output shaft, and said rotating shaft, said three shaft-type power input/output means inputting and outputting power to and from a residual one shaft, based on predetermined powers input to and output from any two shafts among said three shafts; and
    control means for, in response to a predetermined driving requirement, controlling said engine and said first motor in order to enable a power to be output to said drive shaft via said three shaft-type power input/output means, and controlling said second motor in order to enable said second motor to output a power having a greater magnitude than and an opposite direction to the power output to said drive shaft via said three shaft-type power input/output means through the control of said engine and said first motor.

2. A power output apparatus in accordance with claim 1, wherein said control means comprises means for carrying out the control, in order to enable a power output from said engine to be subjected to a torque conversion and output to said drive shaft.

3. A power output apparatus in accordance with claim 2, said power output apparatus further comprising:

target power setting means for setting a target power to be output to said drive shaft, wherein said control means comprises means for, when said predetermined driving requirement represents that said target power setting means has set a power acting in reverse of a rotation of said output shaft of said engine as the target power, controlling operation of said engine in order to enable energy corresponding to the target power to be output from said engine, and controlling said first motor and said second motor in order to enable the power output from said engine to be converted to the target power and output to said drive shaft.

4. A power output apparatus in accordance with claim 1, said power output apparatus further comprising:

storage battery means being charged with an electric power output from said first motor, being discharged to supply an electric power input to said first motor, being charged with an electric power output from said second motor, and being discharged to supply an electric power input to said second motor, wherein said control means comprises means for controlling said engine, said first motor, and said second motor, in order to enable a total energy of a power output from said engine and an electric power input to and output from said storage battery means to be converted and output to said drive shaft.

5. A power output apparatus in accordance with claim 4, said power output apparatus further comprising:

charging state detection means for detecting a charging state of said storage battery means, wherein said control means comprises means for carrying out the control in order to enable the charging state of said storage battery means detected by said charging state detection means to be within a predetermined range.

6. A power output apparatus in accordance with claim 5, said power output apparatus further comprising:

target power setting means for setting a target power to be output to said drive shaft, wherein said control means comprises means for, when the charging state of said storage battery means detected by said charging state detection means is less than the predetermined range, controlling said engine in order to enable output of an energy greater than a specific energy corresponding to the target power set by said target power setting means, and controlling said first motor and said second motor in order to enable the target power to be output to said drive shaft.

7. A power output apparatus for outputting power to a drive shaft, said power output apparatus comprising:

an engine having an output shaft;

a first motor having a rotating shaft and inputting and outputting power to and from said rotating shaft;

a second motor inputting and outputting power to and from said drive shaft;

three shaft-type power input/output means having three shafts respectively linked with said drive shaft, said output shaft, and said rotating shaft, said three shaft-type power input/output means inputting and outputting power to and from a residual one shaft, based on predetermined powers input to and output from any two shafts among said three shafts;

storage battery means being charged with an electric power output from said first motor, being discharged to supply an electric power input to said first motor, being charged with an electric power output from said second motor, and being discharged to supply an electric power input to said second motor;

charging state detection means for detecting a charging state of said storage battery means;

output source determination means for, in response to a predetermined driving requirement, determining whether an electric power stored in said storage battery means is used to output a specific power acting in reverse of a rotation of said output shaft of said engine to said drive shaft or a power output from said engine is converted to the specific power and output to said drive shaft, based on the charging state of said storage battery means detected by said charging state detection means; and control means for controlling said engine, said first motor, and said second motor, in order to enable the specific power acting in reverse of the rotation of said output shaft of said engine to be output to said drive shaft, based on a result of determination by said output source determination means.

8. A power output apparatus for outputting power to a drive shaft, said power output apparatus comprising:

an engine having an output shaft;

a first motor having a rotating shaft and inputting and outputting power to and from said rotating shaft;

a second motor inputting and outputting power to and from said drive shaft;

three shaft-type power input/output means having three shafts respectively linked with said drive shaft, said output shaft, and said rotating shaft, said three shaft-type power input/output means inputting and outputting power to and from a residual one shaft, based on predetermined powers input to and output from any two shafts among said three shafts; and reverse transmission means disposed on said output shaft of said engine for reversing a rotating power of said output shaft and transmitting the reversed rotating power to a subsequent constituent, in response to a predetermined reversing requirement.

9. A power output apparatus for outputting power to a drive shaft, said power output apparatus comprising:

an engine having an output shaft;

a first motor having a rotating shaft and inputting and outputting power to and from said rotating shaft;

a second motor inputting and outputting power to and from said drive shaft;

three shaft-type power input/output means having three shafts respectively linked with said drive shaft, said output shaft, and said rotating shaft, said three shaft-type power input/output means inputting and outputting power to and from a residual one shaft, based on predetermined powers input to and output from any two shafts among said three shafts; and reverse transmission means disposed on said drive shaft for reversing a rotating power of said drive shaft and transmitting the reversed rotating power to a subsequent constituent, in response to a predetermined reversing requirement.

10. A method of controlling a power output apparatus for outputting power to a drive shaft, said method comprising the steps of:

(a) providing (1) an engine having an output shaft; (2) a first motor having a rotating shaft and inputting and outputting power to and from said rotating shaft; (3) a second motor inputting and outputting power to and from said drive shaft; and (4) three shaft-type power input/output means having three shafts respectively linked with said drive shaft, said output shaft, and said rotating shaft, said three shaft-type power input/output means inputting and outputting power to and from a residual one shaft, bas ed on predetermined powers input to and output from any two shafts among said three shafts;

(b) controlling said engine and said first motor in order to enable a power to be output to said drive shaft via said three shaft-type power input/output means; and (c) controlling said second motor in order to enable said second motor to output a power having a greater magnitude than and an opposite direction to the power output to said drive shaft via said three shaft-type power input/output means through the control of said engine and said first motor.

11. A method of controlling a power output apparatus for outputting power to a drive shaft, said method comprising the steps of:

(a) providing (1) an engine having an output shaft; (2) a first motor having a rotating shaft and inputting and outputting power to and from said rotating shaft; (3) a second motor inputting and outputting power to and from said drive shaft; (4) three shaft-type power input/output means having three shafts respectively linked with said drive shaft, said output shaft, and said rotating shaft, said three shaft-type power input/output means inputting and outputting power to and from a residual one shaft, based on predetermined powers input to and output from any two shafts among said three shafts; and (5) storage battery means being charged with an electric power output from said first motor, being discharged to supply an electric power input to said first motor, being charged with an electric power output from said second motor, and being discharged to supply an electric power input to said second motor;

(b) setting a power acting in reverse of a rotation of said output shaft of said engine as a target power to be output to said drive shaft;

(c) detecting a charging state of said storage battery means; and (d) when the charging state of said storage battery means detected in said step (c) is less than a predetermined range, controlling said engine in order to enable output of an energy greater than a specific energy corresponding to the target power set in said step (b), and controlling said first motor and said second motor in order to enable the target power to be output to said drive shaft.

12. A method of controlling a power output apparatus for outputting power to a drive shaft, said method comprising the steps of:

(a) providing (1) an engine having an output shaft; (2) a first motor having a rotating shaft and inputting and outputting power to and from said rotating shaft; (3) a second motor inputting and outputting power to and from said drive shaft; (4) three shaft-type power input/output means having three shafts respectively linked with said drive shaft, said output shaft, and said rotating shaft, said three shaft-type power input/output means inputting and outputting power to and from a residual one shaft, based on predetermined powers input to and output from any two shafts among said three shafts; and (5) storage battery means being charged with an electric power output from said first motor, being discharged to supply an electric power input to said first motor, being charged with an electric power output from said second motor, and being discharged to supply an electric power input to said second motor;

(b) detecting a charging state of said storage battery means;

(c) when the charging state of said storage battery means detected in said step (b) is within a predetermined range, controlling said second motor in order to enable said second motor to utilize an electric power stored in said storage battery means and output a specific power acting in reverse of a rotation of said output shaft of said engine to said drive shaft; and (d) when the charging state of said storage battery means detected in said step (b) is less than the predetermined range, controlling said engine, said first motor, and said second motor in order to enable a power output from said engine to be converted to the specific power acting in reverse of the rotation of said output shaft of said engine and output to said drive shaft.

* * * * *